United States Patent
Sareen et al.

(10) Patent No.: US 10,769,335 B1
(45) Date of Patent: Sep. 8, 2020

(54) SYSTEM AND METHOD FOR GRAPH BASED VERIFICATION OF ELECTRONIC CIRCUIT DESIGN

(71) Applicant: NXP USA, Inc., Austin, TX (US)

(72) Inventors: Pushkar Sareen, Noida (IN); Abinash Ranchi (IN); Piyush Pandey, Delhi (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/667,748

(22) Filed: Oct. 29, 2019

(51) Int. Cl.
  *G06F 30/30* (2020.01)
  *G06F 30/3323* (2020.01)
  *G06F 119/20* (2020.01)
  *G06F 111/20* (2020.01)

(52) U.S. Cl.
  CPC .......... *G06F 30/3323* (2020.01); *G06F 30/30* (2020.01); *G06F 2111/20* (2020.01)

(58) Field of Classification Search
  CPC .. G06F 30/3323; G06F 30/30; G06F 2111/20; G06F 111/20
  See application file for complete search history.

(56) References Cited

U.S. PATENT DOCUMENTS

| | | | | |
|---|---|---|---|---|
| 6,473,881 B1 * | 10/2002 | Lehner | | G06F 30/39 716/107 |
| 6,928,633 B1 * | 8/2005 | Teig | | G06F 30/394 716/130 |
| 7,222,317 B1 * | 5/2007 | Mathur | | G06F 30/18 716/107 |
| 7,933,915 B2 | 4/2011 | Singh et al. | | |
| 8,046,206 B1 | 10/2011 | Hood, III et al. | | |
| 8,745,561 B1 * | 6/2014 | Garg | | G06F 30/00 716/113 |
| 2010/0192117 A1 * | 7/2010 | Zhu | | G06F 30/3312 716/113 |
| 2015/0067626 A1 * | 3/2015 | Chen | | G06F 30/394 716/111 |

OTHER PUBLICATIONS

Ling, Z. "SubCircuit Extraction with SubGraph Isomorphism", IBM, 14 pgs.

(Continued)

*Primary Examiner* — Vuthe Siek
(74) *Attorney, Agent, or Firm* — Rajeev Madnawat

(57) ABSTRACT

An electronic design automation (EDA) tool for executing topological and functional checks on an electronic circuit design (ECD) includes a processor and a memory that stores the ECD, graphical rules, and filter rules for executing the checks. The processor generates a test graph based on the ECD, replaces stretchable nodes with nested networks in the test graph to generate extended graphs, and decouples real edges and functional edges of each extended graph to generate real graphs and functional graphs, respectively. Based on the graphical rules, the processor executes the topological checks on an input graph of the ECD to identify real sub-graphs from the input graph that are isomorphic to a real graph. The processor further generates functional sub-graphs by combining a functional graph with each real sub-graph, and based on the filter rules, further executes the functional checks on the functional sub-graphs to identify output graphs.

20 Claims, 18 Drawing Sheets

(56) References Cited

OTHER PUBLICATIONS

Watanabe, T. et al. "A New Automatic Logic Interconnection Verification System for VLSI Design", IEEE Transactions on Computer-Aided Design of Integrated Circuits and Systems, vol. CAD-2, No. 2, 13 pgs. (Apr. 1983).

Giugno, R. et al. "GraphGrep: A Fast and Universal Method for Querying Graphs", IEEE Object recognition supported by user interaction for service robots, 4 pgs. (Aug. 2002).

* cited by examiner

US 10,769,335 B1

SYSTEM AND METHOD FOR GRAPH BASED VERIFICATION OF ELECTRONIC CIRCUIT DESIGN

BACKGROUND

The present invention relates generally to electronic design automation (EDA) tools, and, more particularly, to an EDA tool for executing topological and functional checks on an electronic circuit design.

Electronic circuits typically include millions of components. Such complex designs of electronic circuits are verified for a desired topology and functionality by an electronic design automation (EDA) tool. An EDA tool implements various topological and functional checks, such as interconnect performance checks, register transfer level (RTL) integration checks, clock domain crossing (CDC) checks, and the like, for verifying the electronic circuit design.

A known method for performing the aforementioned checks by the EDA tool includes simulating the electronic circuit design based on predefined design rules. However, the stated method fails to check whether the electronic circuit design has the required topology and properties, and whether undesired effects, such as overlapping paths of the components of the ECD, are absent in the electronic circuit design. Further, the method fails to perform functional checks on the electronic circuit design. Other known methods that perform topological checks verify the electronic circuit design graphically by way of the EDA tool. To verify the electronic circuit design graphically, various topologies of the electronic circuit design are verified one after the other. In an example, to verify a first topology that includes first and second nodes (i.e., two different components of the ECD) that are not connected to each other, several test graphs are generated such that each graph verifies a possibility of a direct or indirect connection between the two nodes. However, the generation of multiple such test graphs affects the speed of operation of the EDA tool. Further, such methods fail to perform graph based functional checks on the electronic circuit design.

Therefore, it would be advantageous to have a system and method that executes graph based topological and functional checks on the electronic circuit design and overcomes the aforementioned problems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
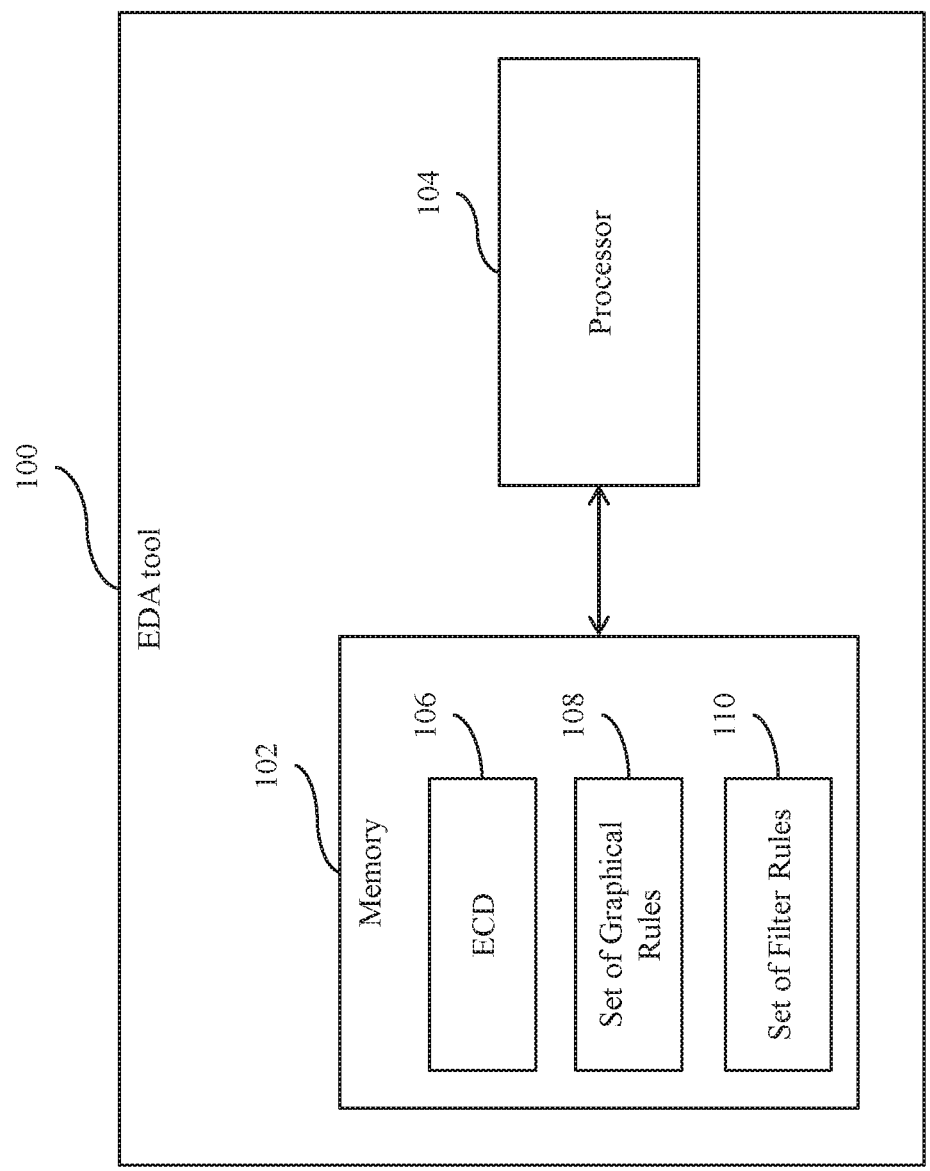
FIG. 1 is a schematic block diagram of an electronic design automation (EDA) tool in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides an electronic design automation (EDA) tool for executing topological and functional checks on an electronic circuit design. The EDA tool includes a memory and a processor in communication with the memory. The memory stores the electronic circuit design, a set of graphical rules, and a set of filter rules for executing the topological and functional checks. The processor generates a test graph based on the electronic circuit design. The test graph comprises a first set of normal nodes, a set of stretchable nodes, a first set of real edges, and a first set of functional edges. The processor replaces the set of stretchable nodes with a set of nested networks in the test graph to generate a set of extended graphs. Each extended graph comprises the first set of normal nodes, the set of nested networks, a second set of real edges, and a second set of functional edges. The processor decouples the second set of real edges and the second set of functional edges of each extended graph to generate a set of real graphs and a set of functional graphs, respectively. The processor executes the topological checks on an input graph of the electronic circuit design, based on the set of graphical rules, to identify a set of real sub-graphs from the input graph. Each real sub-graph is isomorphic to a first real graph of the set of real graphs. The processor further generates a set of functional sub-graphs by combining a first functional graph of the set of functional graphs with each real sub-graph, and further executes the functional checks on the set of functional sub-graphs, based on the set of filter rules, to identify a set of output graphs.

In another embodiment, the present invention provides a method for executing topological and functional checks on an electronic circuit design by using an EDA tool. The EDA tool includes a memory and a processor in communication with the memory. The memory stores the electronic circuit design, a set of graphical rules, and a set of filter rules for executing the topological and functional checks. A test graph is generated based on the electronic circuit design. The test graph comprises a first set of normal nodes, a set of stretchable nodes, a first set of real edges, and a first set of functional edges. The set of stretchable nodes are replaced with a set of nested networks in the test graph to generate a set of extended graphs. Each extended graph comprises the first set of normal nodes, the set of nested networks, a second set of real edges, and a second set of functional edges. The second set of real edges and the second set of functional edges of each extended graph are decoupled to generate a set of real graphs and a set of functional graphs, respectively. The topological checks are executed on an input graph of the electronic circuit design, based on the set of graphical rules, to identify a set of real sub-graphs from the input graph. Each real sub-graph is isomorphic to a first real graph of the set of real graphs. A set of functional sub-graphs is generated by combining a first functional graph of the set of functional graphs with each real sub-graph, and the functional checks are executed on the set of functional sub-graphs, based on the set of filter rules, to identify a set of output graphs.

Various embodiments of the present invention provide an EDA tool for executing topological and functional checks on an electronic circuit design. The EDA tool generates a test graph based on the electronic circuit design. A set of stretchable nodes in the test graph is replaced with a set of nested networks to generate a set of extended graphs. A set of real edges and a set of functional edges in each extended graph are decoupled from each other to generate a set of real graphs and a set of functional graphs, respectively. The EDA tool executes the topological checks on an input graph of the electronic circuit design, based on a set of graphical rules, to identify a set of real sub-graphs from the input graph. Further, based on the set of filter rules, the EDA tool executes the functional checks on a set of functional sub-graphs (that are generated by combining each functional graph with each real sub-graph), to identify a set of output graphs.

The EDA tool executes the topological checks by verifying whether the electronic circuit design has required topology and properties based on the test graph. Additionally, the functional checks are performed simultaneously with the topological checks by verifying whether the electronic circuit design has required functionalities based on the first set of functional edges of the test graph. As the EDA tool verifies each possibility of a connection between two normal nodes by way of the set of stretchable nodes in a single test graph, thus, the EDA tool has a high speed of operation as compared to the conventional graph based methods that utilize multiple test graphs.

Referring now to FIG. 1, a schematic block diagram of an electronic design automation (EDA) tool 100, in accordance with an embodiment of the present invention is shown. The EDA tool 100 includes a memory 102 and a processor 104 that communicates with the memory 102. The processor 104 and the memory 102 form a computer system that may represent a stand-alone personal computer, a network of processors and memories, a mainframe system, or the like.

The memory 102 stores an electronic circuit design (ECD) 106. The verification of the ECD 106 is performed by executing topological and functional checks on the ECD 106 by the EDA tool 100. Examples of the topological and functional checks include interconnect performance checks, register transfer level (RTL) integration checks, clock domain crossing (CDC) checks, and the like. The ECD 106 may be an integrated circuit (IC) design, a system-on-chip (SoC) design, an application specific IC (ASIC) design, or the like. A user (not shown) may upload the ECD 106 in the EDA tool 100 or utilize the EDA tool 100 to generate the ECD 106.

The ECD 106 may include digital logic components, digital memory components, embedded memories, analog components, or a combination thereof. Examples of digital logic components include an AND gate, an OR gate, a NOT gate, a NOR gate, a NAND gate, an XOR gate, an XNOR gate, and/or a combinational logic circuit that includes a combination of the above-mentioned gates. Examples of digital memory components include a flip-flop, a latch, a shift-register, a multiplexer, a demultiplexer, and the like. Examples of embedded memories include a static random-access memory (SRAM), a dynamic random-access memory (DRAM), and a flash memory. Examples of analog components include resistors, capacitors, diodes, inductor, transistors, transducers, sensors, and the like.

To execute the topological and functional checks on the ECD 106, the memory 102 stores a set of graphical rules 108 and a set of filter rules 110 that define a set of topological filters, a first set of functional filters, and a second set of functional filters. The set of topological filters is utilized to identify and filter topologies from the ECD 106 that do not satisfy desired criteria of the topology defined by the set of topological filters. In one example, if a topological filter defines a fan-out capacity of an AND gate to be less than '10', the topologies containing AND gates with a fan-out capacity greater than '10' are filtered. The first and second sets of functional filters (hereinafter referred to as the "sets of filters") are utilized for performing functional checks on the ECD 106 based on desired functions that are defined by the first set of functional filters. In one example, if a functional filter defines a buffering capacity between two RAMs to be greater than '10 kilobytes (KB)', the topologies containing two RAMs with a buffering capacity less than '10 KB' are filtered. Examples of the memory 102 include, but are not limited to, a DRAM, an SRAM, and the like.

The set of topological filters and the sets of functional filters are applied on an input graph 200 (shown in FIG. 2) of the ECD 106 to identify a graph (i.e., an output graph 1500 shown in FIG. 15) that satisfies the desired criteria of the topology and functions of each of the set of topological filters and the sets of functional filters, respectively. The output graph 1500 is further utilized to debug the ECD 106. Examples of the processor 104 include, but are not limited to, an application-specific integrated circuit (ASIC) processor, a reduced instruction set computing (RISC) processor, a complex instruction set computing (CISC) processor, a field-programmable gate array (FPGA), and the like.

Figure 2:
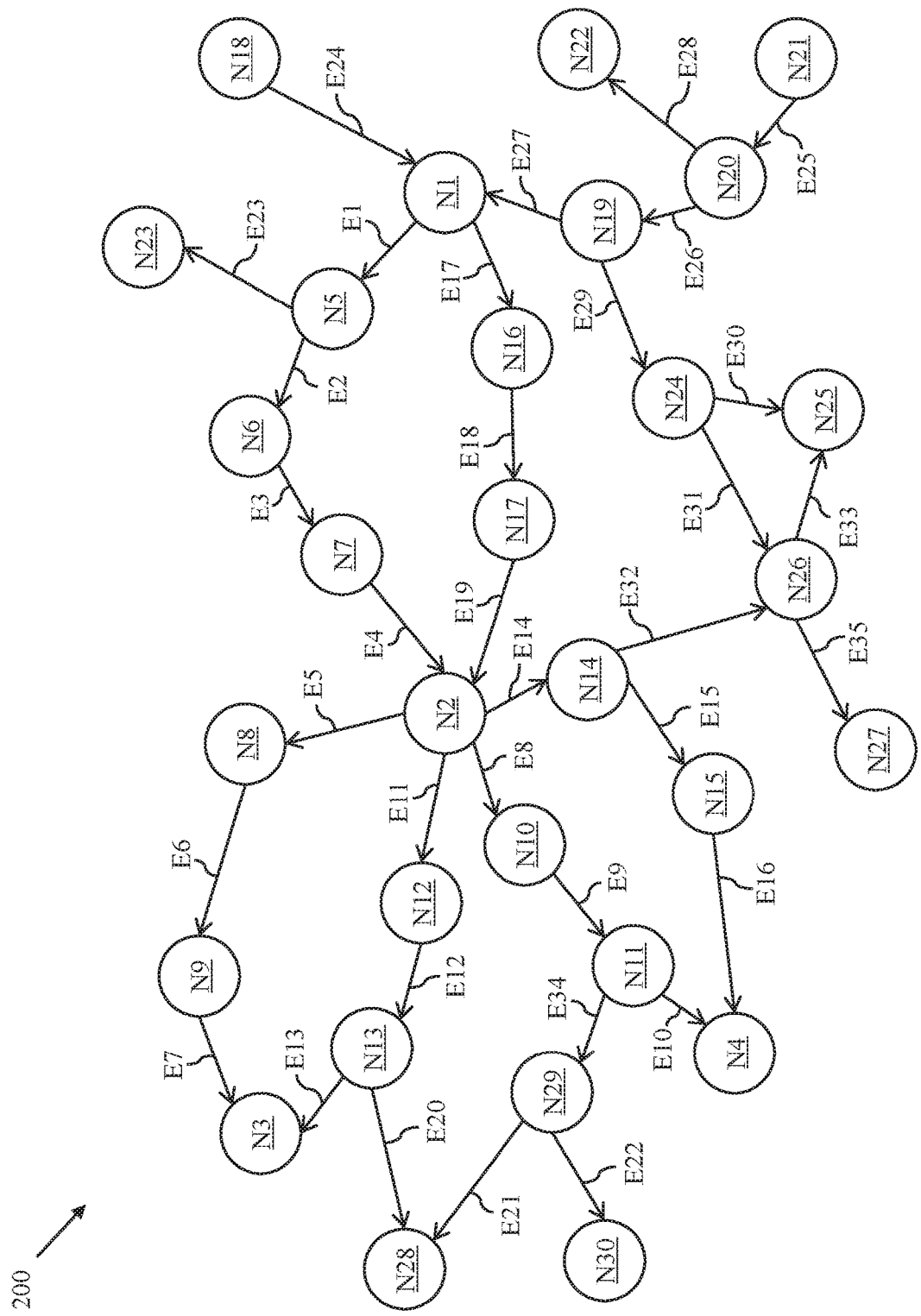
FIG. 2 is a block diagram that illustrates an input graph of an electronic circuit design (ECD) of FIG. 1 in accordance with an embodiment of the present invention.

Referring now to FIG. 2, a block diagram illustrating an input graph 200 of the ECD 106, in accordance with an embodiment of the present invention is shown. The processor 104 retrieves the ECD 106 from the memory 102 and converts the ECD 106 into a graph data structure, i.e., the input graph 200. Since, the ECD 106 includes components and connections for connecting the components, the input graph 200 is generated by converting the components and connections of each component to nodes and edges, respectively.

The input graph 200 includes normal nodes such as a first set of normal nodes N1-N30, and real edges such as a first set of real edges E1-E35. A normal node thus represents a digital or analog component of the ECD 106. Each normal node of the first set of normal nodes N1-N30 is associated with a first set of node attributes. A node attribute determines properties of the nodes, i.e., properties of digital or analog components of the ECD 106. In one example, a first normal node N1 represents an OR gate. Thus, the first set of node attributes associated with the first normal node N1 may include a fan-in capacity of the first normal node N1, a fan-out capacity of the first normal node N1, and the like.

A real edge represents a wired connection between two digital components, two analog components, or a digital component and an analog component. In an example, the ECD 106 includes a first AND gate (not shown) and a second AND gate (not shown) that are connected by way of a wired connection. Thus, the wired connection between the first and second AND gates is represented by way of a real edge, such as a first real edge E1, in the input graph 200. The wired connection may be implemented by a single line wire, a multi-line wire, and the like. Each real edge of the first set of real edges E1-E35 is associated with a first set of edge attributes. An edge attribute determines properties of connection between two digital components, two analog components, or a digital component and an analog component, of the ECD 106. In one example, the first real edge E1 is associated with multiple edge attributes such as a bandwidth, a buffering capacity, and the like, of the first real edge E1.

Figure 3:
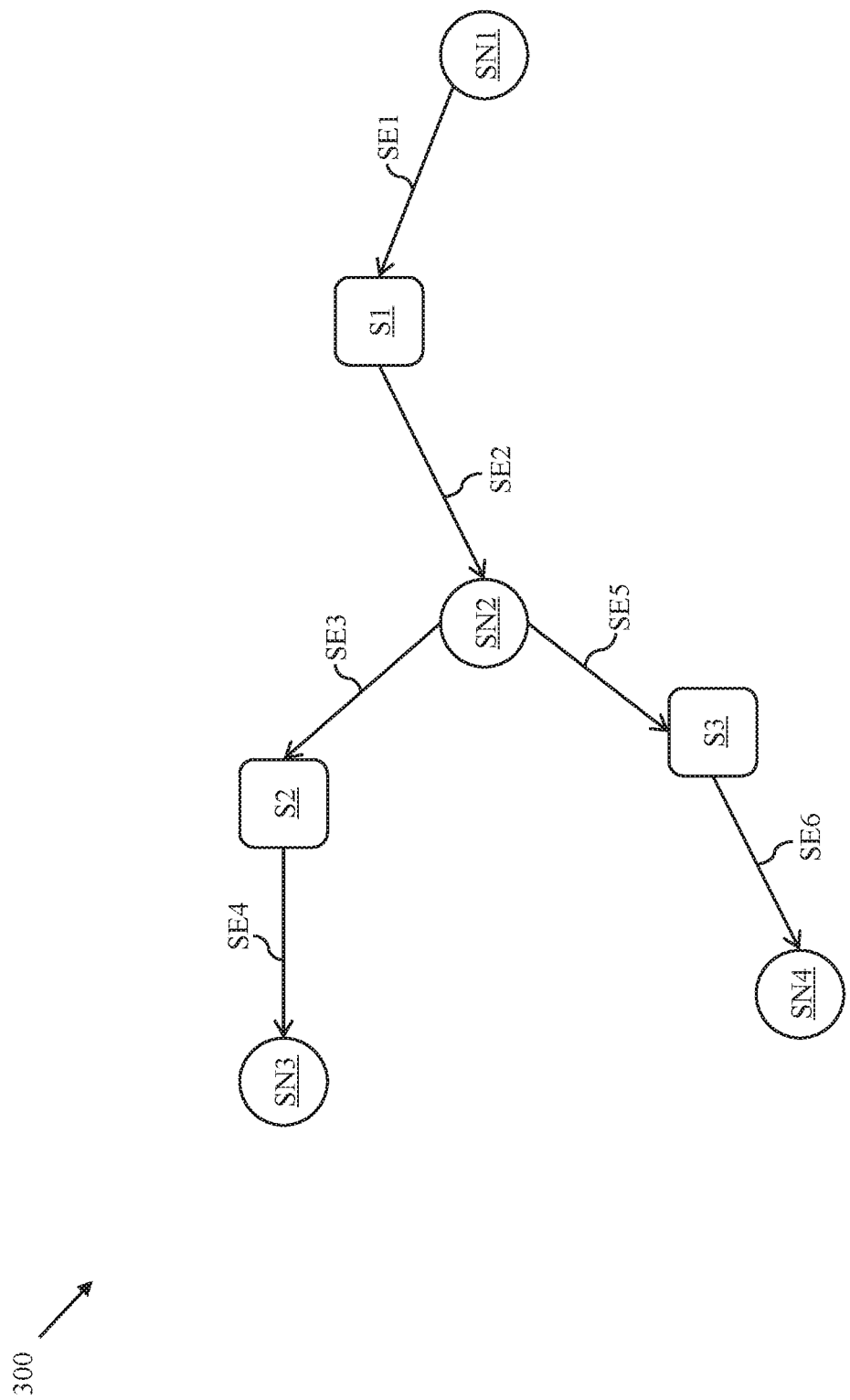
FIG. 3 is a block diagram that illustrates a base graph based on the ECD of FIG. 1 in accordance with an embodiment of the present invention.

Referring now to FIG. 3, a block diagram illustrating a base graph 300 based on the ECD 106, in accordance with an embodiment of the present invention is shown. The base graph 300 is utilized to generate a test graph 400 (shown in FIG. 4) to execute the topological and functional checks on the ECD 106. The base graph 300 is generated by converting a topology of a selected portion of the ECD 106 that is required to be verified, into a graph data structure. Thus, the ECD 106 may be verified by generating multiple such base graphs for verifying corresponding portions of the ECD 106. For the sake of simplicity of the ongoing discussion and without limiting the scope of the invention, one base graph, i.e., the base graph 300, is generated. The user may upload the base graph 300 in the EDA tool 100) or utilize the EDA tool 100 to generate the base graph 300.

The base graph 300 includes a second set of normal nodes SN1-SN4, a second set of real edges SE1-SE6, and a set of stretchable nodes S1-S3. Each stretchable node of the set of stretchable nodes S1-S3 represents a set of digital components, a set of analog components, or a combination thereof, of the ECD 106 that may be connected between two normal nodes. In an example, a first stretchable node S1 (i.e., a set of digital components in the ECD 106) is connected between two normal nodes, such as second and third normal nodes SN1 and SN2 (i.e., between the first and second AND gates of the ECD 106). On generating the base graph 300, the processor 104 adds the set of topological filters to the second set of normal nodes SN1-SN4 and the set of stretchable nodes S I-S3 for defining the properties of the nodes in the base graph 300. In one example, a first topological filter is added to the second normal node SN1 such that the first topological filter defines a fan-out capacity of the second normal node SN1 to be less than or equal to 10.

Figure 4:
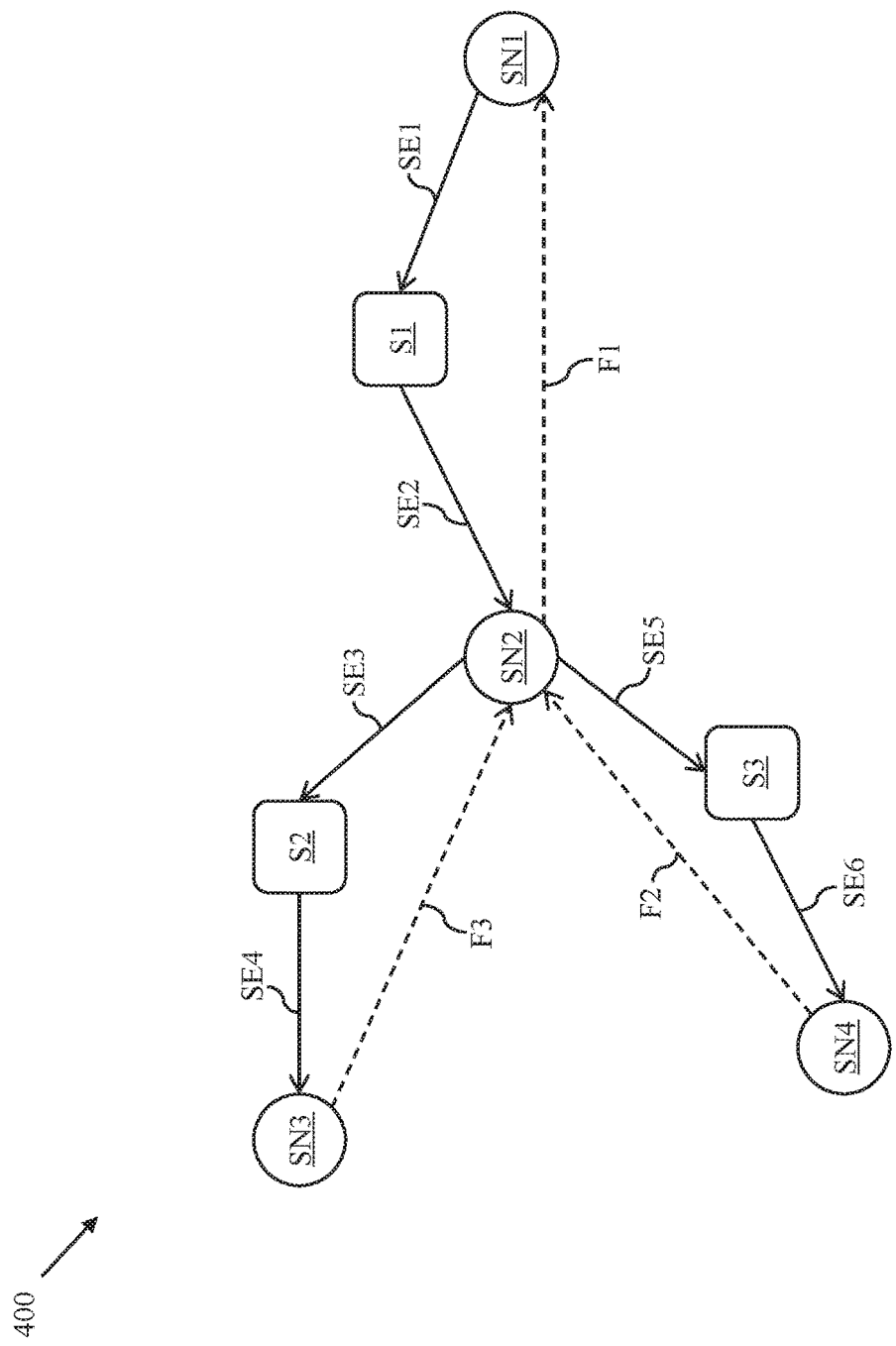
FIG. 4 is a block diagram that illustrates a test graph based on the base graph of FIG. 3 in accordance with an embodiment of the present invention.

Referring now to FIG. 4, a block diagram illustrating a test graph 400 based on the base graph 300, in accordance with an embodiment of the present invention is shown. To generate the test graph 400, the processor 104 adds to the base graph 300, a first set of functional edges F1-F3, and a first set of functional filters to each of the first set of functional edges F1-F3, thereby associating the first set of functional filters with the first set of functional edges F1-F3. The test graph 400 thus includes the second set of normal nodes SN1-SN4, the second set of real edges SE1-SE6, the set of stretchable nodes S1-S3, and the first set of functional edges F1-F3. A functional edge represents a functional connection, between two digital components, two analog components, or a digital component and an analog component. The first set of functional filters define functional checks to be executed on the ECD 106 for verifying the ECD 106 based on the desired functions. In one example, a first functional filter is added to a first functional edge F1. The first functional filter defines a buffering capacity of the first functional edge F1 to be greater than or equal to '10 KB'.

Each normal node of the second set of normal nodes SN1-SN4, and each stretchable node of the set of stretchable nodes S1-S3 is associated with a second set of node attributes. The second set of node attributes is similar to the first set of node attributes. The set of topological filters is utilized to perform the topological checks based on the first and second sets of node attributes. Each real edge of the second set of real edges SE1-SE6 and each functional edge of the first set of functional edges F1-F3 is associated with a second set of edge attributes. The second set of edge attributes is similar to the first set of edge attributes. The first set of functional filters is utilized to perform the functional checks based on the first and second sets of edge attributes.

Figure 5:
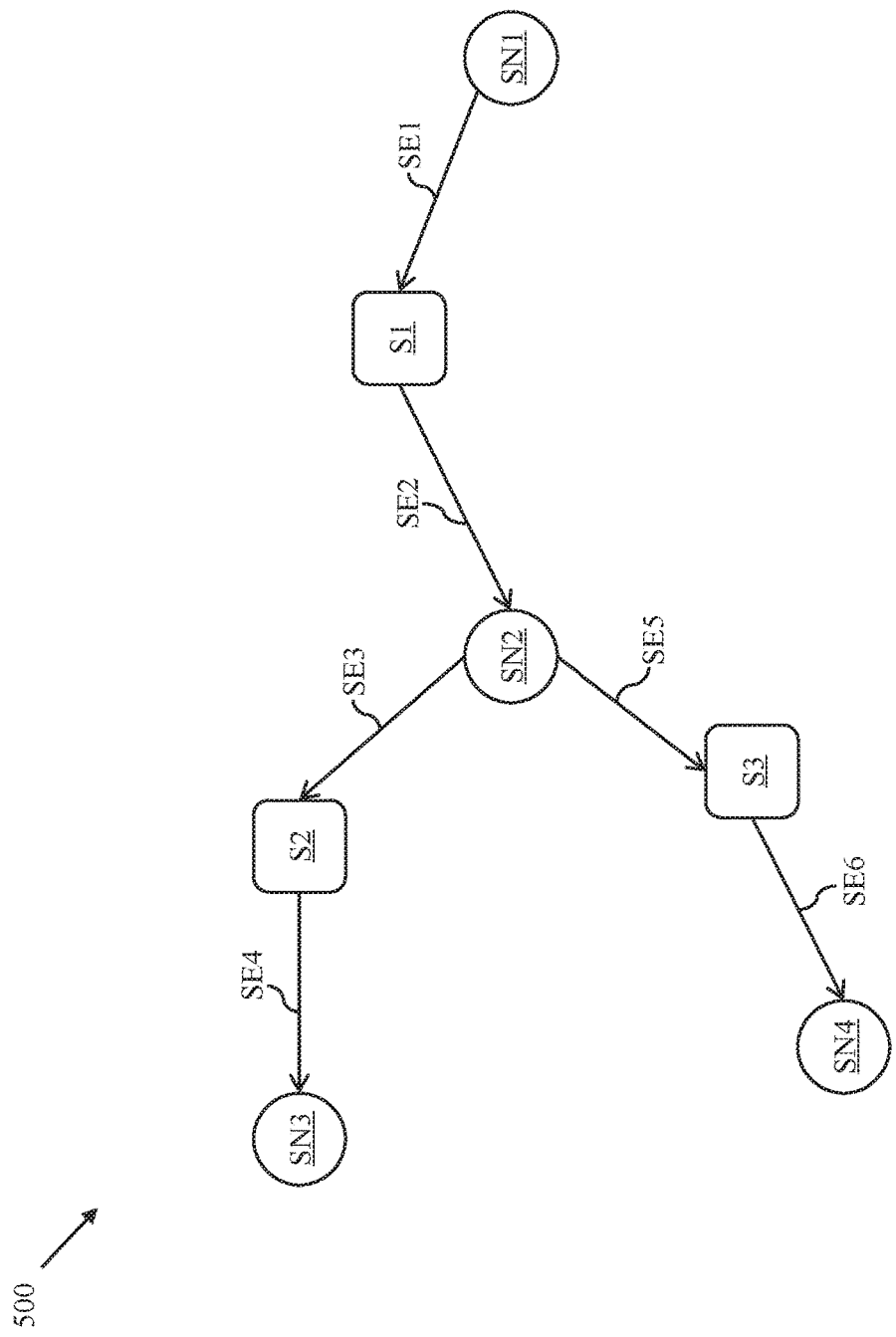
FIG. 5 is a block diagram that illustrates a first sub-graph of the test graph of FIG. 4 in accordance with an embodiment of the present invention.

Referring now to FIG. 5, a block diagram illustrating a first sub-graph 500 of the test graph 400, in accordance with an embodiment of the present invention is shown. The first sub-graph 500 includes all normal nodes and all real edges of the test graph 400. The first sub-graph 500 thus includes the second set of normal nodes SN1-SN4, the second set of real edges SE1-SE6, and the set of stretchable nodes S1-S3. The first sub-graph 500 is utilized to identify multiple nested networks (shown in FIGS. 6 and 7) and generate a set of extended graphs (shown in FIGS. 6 and 7).

Figure 6:
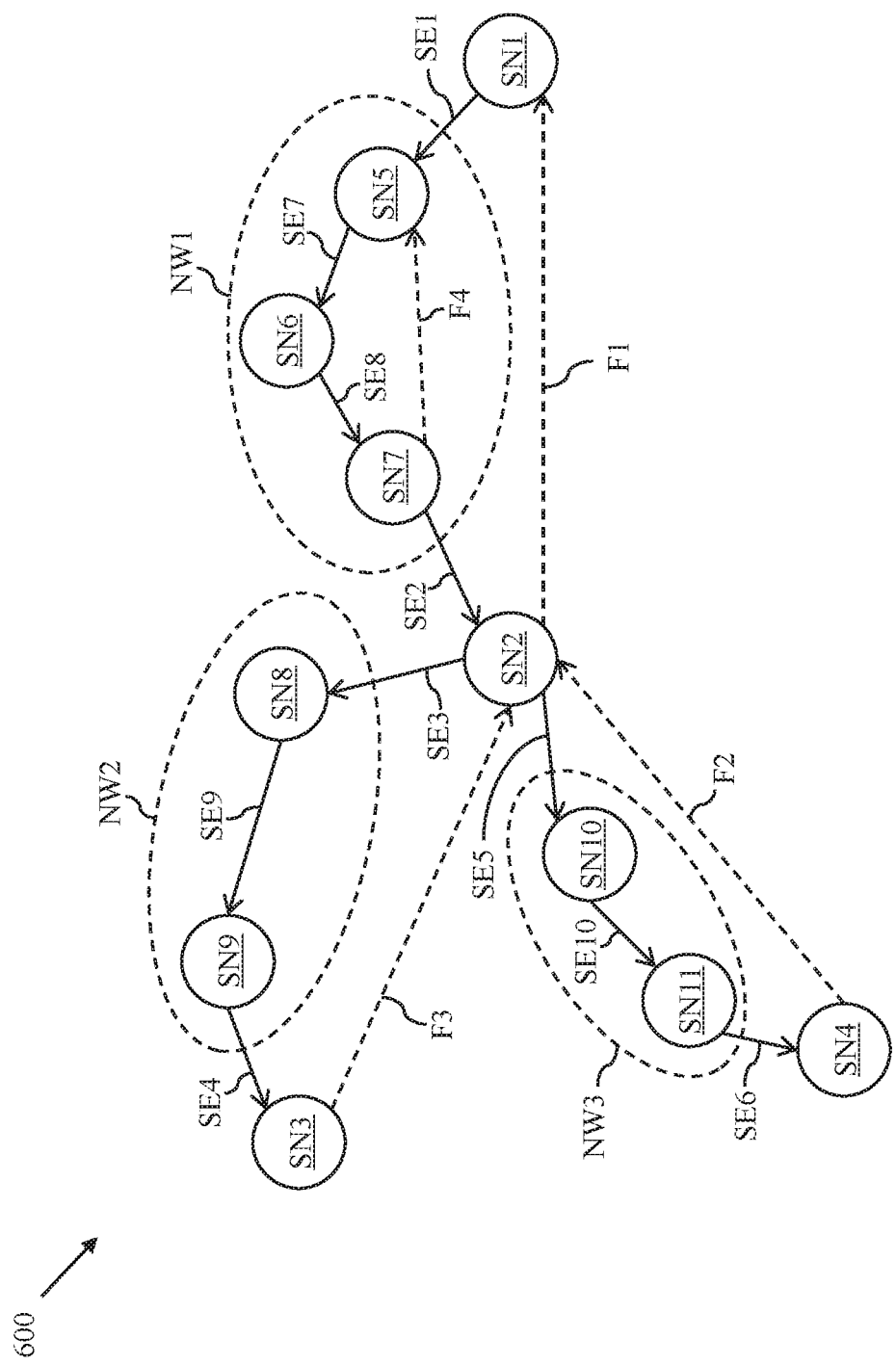
FIG. 6 is a block diagram that illustrates a first extended graph of the test graph of FIG. 4 in accordance with an embodiment of the present invention.

Referring now to FIG. 6, a block diagram illustrating a first extended graph 600 of the test graph 400, in accordance with an embodiment of the present invention is shown. To generate the first extended graph 600, the processor 104 replaces the set of stretchable nodes S1-S3 in the first sub-graph 500 with a first set of nested networks (i.e., first through third nested networks NW1-NW3) and adds the first set of functional edges F1-F3 of the test graph 400 in the first extended graph 600.

Each stretchable node, such as the first stretchable node S1, in the first sub-graph 500 represents a nested network, such as the first nested network NW1 that may be connected between two normal nodes, such as the second and third normal nodes SN1 and SN2, of the first sub-graph 500. A nested network may include a set of normal nodes, a set of real edges, and a set of functional edges. To identify multiple nested networks, the processor 104 identifies a set of independent paths between the two normal nodes of the first sub-graph 500 and generates a set of equations for the set of independent paths. In one example, the processor 104 identifies a first path between the second normal node SN1 and a fourth normal node SN3 as 'SN1→S1→SN2→S2→SN3' and generates a set of equations for the first path. Each stretchable node of the first sub-graph 500 is represented as a variable in the set of equations. In one example, the set of equations for the first path is represented as 'x+y<=9' and 'x+y>=0', where 'x' and 'y' are variables that represent the first stretchable node S1 and a second stretchable node S2, respectively.

The set of equations is generated based on predefined minimum and maximum path lengths between the two normal nodes. The predefined minimum path length is a lowest number of normal nodes that may be present between the two normal nodes. The predefined maximum path length is a highest number of normal nodes that may be present between the two normal nodes. In one example, the predefined minimum path length is '1' and the predefined maximum path length is '10'. Thus, a number of normal nodes between the two normal nodes, such as the second and fourth normal nodes SN1 and SN3, may be between '1' and '10'.

The processor 104 executes a backtracking algorithm to obtain a set of solutions that satisfies the set of equations. Each solution provides a value to each stretchable node of the set of stretchable nodes S1-S3, such that the value represents a number of normal nodes that may be present in the corresponding nested network, that is between the lowest and highest number of normal nodes that are defined by the minimum and maximum path lengths, respectively. In one example, the first solution provides values '3', '2', and '2' to the first stretchable node S1, the second stretchable node S2, and a third stretchable node S3, respectively. Based on the first solution, the processor 104 identifies the first set of nested networks from the multiple nested networks such that the first through third nested networks NW1-NW3 include '3', '2', and '2' normal nodes, respectively. While replacing the set of stretchable nodes S1-S3 with the first through third nested networks NW1-NW3, a set of normal nodes and a set of real edges associated with the first through third nested networks NW1-NW3 are added in the first sub-graph 500. In an example, the set of stretchable nodes S1-S3, i.e., the first through third stretchable nodes S1-S3 are replaced with the first through third nested networks NW1-NW3, respectively. The first solution provides a value '3' to the first stretchable node S1, thus the first nested network NW1 includes three normal nodes, i.e., a third set of normal nodes SN5-SN7. The first nested network NW1 further includes a third set of real edges SE7 and SE8, and a second set of functional edges that includes a second functional edge F4.

The second nested network NW2 includes a fourth set of normal nodes SN8 and SN9, and a fourth set of real edges that includes a second real edge SE9. The third nested network NW3 includes a fifth set of normal nodes SN10 and SN11, and a fifth set of real edges that includes a third real edge SE10. The first extended graph 600 thus includes each node of the second through fifth sets of normal nodes SN1-SN11 (hereinafter referred to as a "sixth set of normal nodes SN1-SN11"), each real edge of the second and third sets of real edges SE1-SE8 and the second and third real edges SE9 and SE10 (hereinafter referred to as a "sixth set of real edges SE1-SE10"), and each functional edge of the first set of functional edges F1-F3 and the second functional edge F4 (hereinafter referred to as a "third set of functional edges F1-F4").

Figure 7:
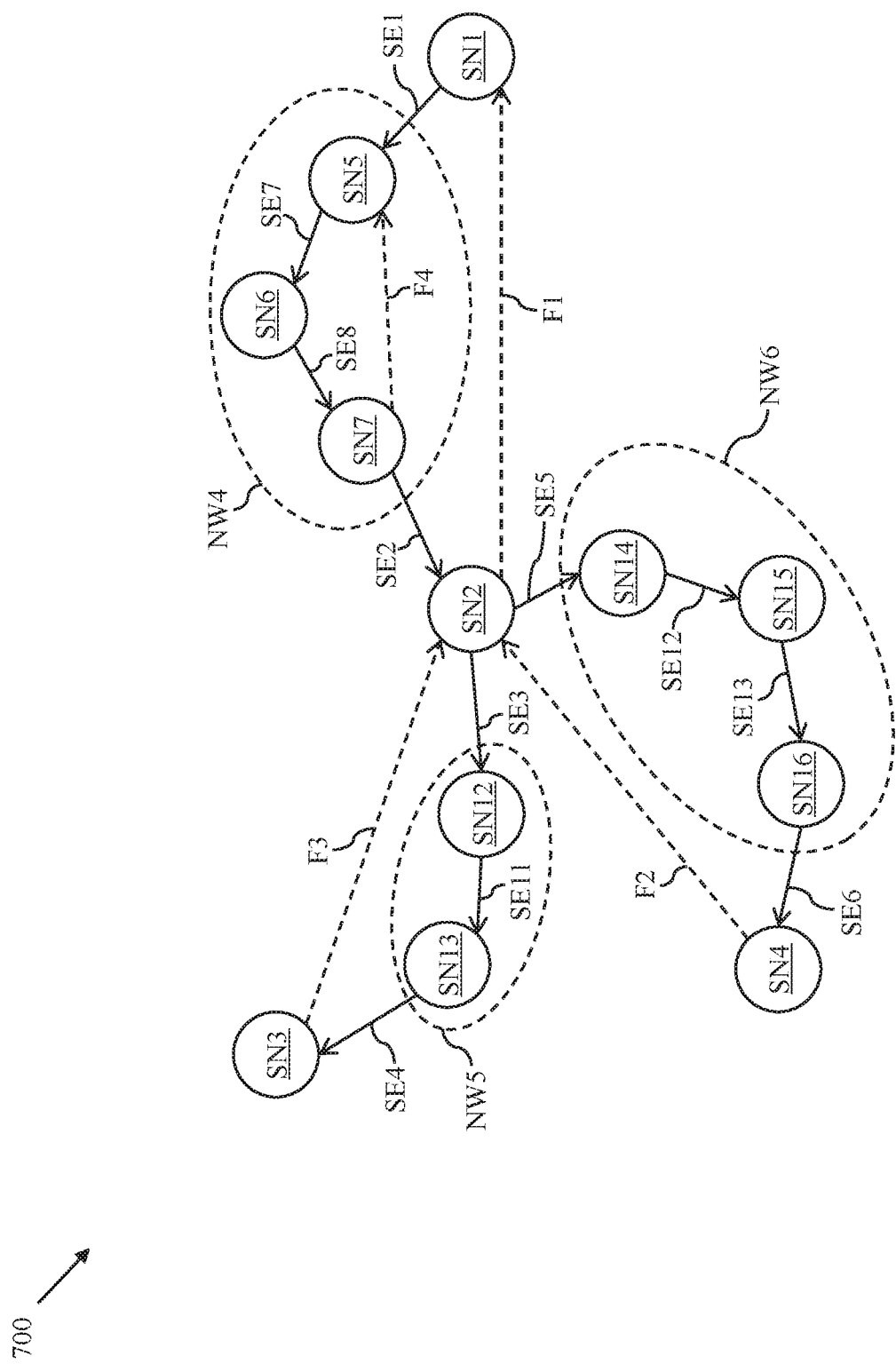
FIG. 7 is a block diagram that illustrates a second extended graph of the test graph of FIG. 4 in accordance with an embodiment of the present invention.

Referring now to FIG. 7, a block diagram illustrating a second extended graph 700 of the test graph 400, in accordance with an embodiment of the present invention is shown. To generate the second extended graph 700, the processor 104 replaces the set of stretchable nodes S1-S3 in the test graph 400 with a second set of nested networks (i.e., fourth through sixth nested networks NW4-NW6). Based on a second solution of the set of solutions and the predefined minimum and maximum path lengths, the processor 104 further identifies the second set of nested networks from the multiple nested networks in a manner similar to the identification of the first set of nested networks. The first through third stretchable nodes S1-S3 are replaced with the fourth through sixth nested networks NW4-NW6, respectively. The fourth nested network NW4 includes the third set of normal nodes SN5-SN7, the third set of real edges SE7 and SE8, and the second set of functional edges F4. The fifth nested network NW5 includes a seventh set of normal nodes SN12 and SN13, and a seventh set of real edges that includes a fourth real edge SE1. The sixth nested network NW6 includes an eighth set of normal nodes SN14-SN16 and an eighth set of real edges SE12 and SE13. The second extended graph 700 thus includes each normal node of the second, third, seventh, and eighth sets of normal nodes SN1-SN7 and SN12-SN16 (hereinafter referred to as a "ninth set of normal nodes SN1-SN7 and SN12-SN16"), each real edge of the second, third, and eighth sets of real edges SE1-SE8 and SE12 and SE13, and the fourth real edge SE1 (hereinafter referred to as a "ninth set of real edges SE1-SE8 and SE 11-SE13"), and the third set of functional edges F1-F4.

It will be apparent to those of skill in the art that the scope of the invention is not limited to the first and second extended graphs 600 and 700 but may include a number of extended graphs for each solution in the set of solutions.

Figure 8:
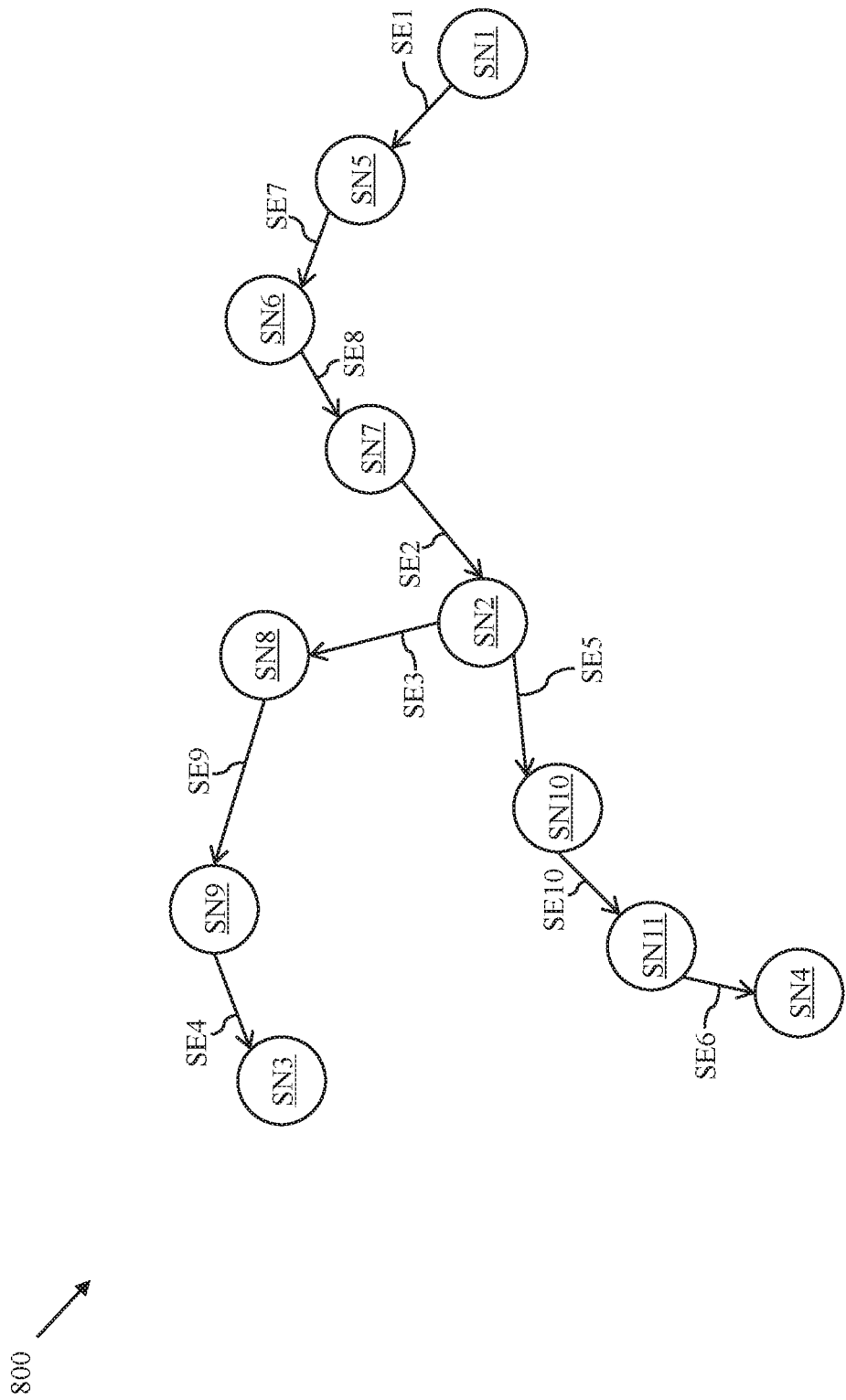
FIG. 8 is a block diagram that illustrates a first real graph of the first extended graph of FIG. 6 in accordance with an embodiment of the present invention.

Referring now to FIG. 8, a block diagram illustrating a first real graph 800 of the first extended graph 600, in accordance with an embodiment of the present invention is shown. The first real graph 800 is a sub-graph of the first extended graph 600, and includes the sixth set of normal nodes SN1-SN11 and the sixth set of real edges SE1-SE10. To generate the first real graph 800, the processor 104 decouples the sixth set of real edges SE1-SE10 and corresponding normal nodes from the first extended graph 600, such that the third set of functional edges F1-F4 are excluded in the first real graph 800. Similarly, a set of real graphs (that includes the first real graph 800) is generated by decoupling the real edges in the corresponding extended graphs, respectively.

Figure 9:
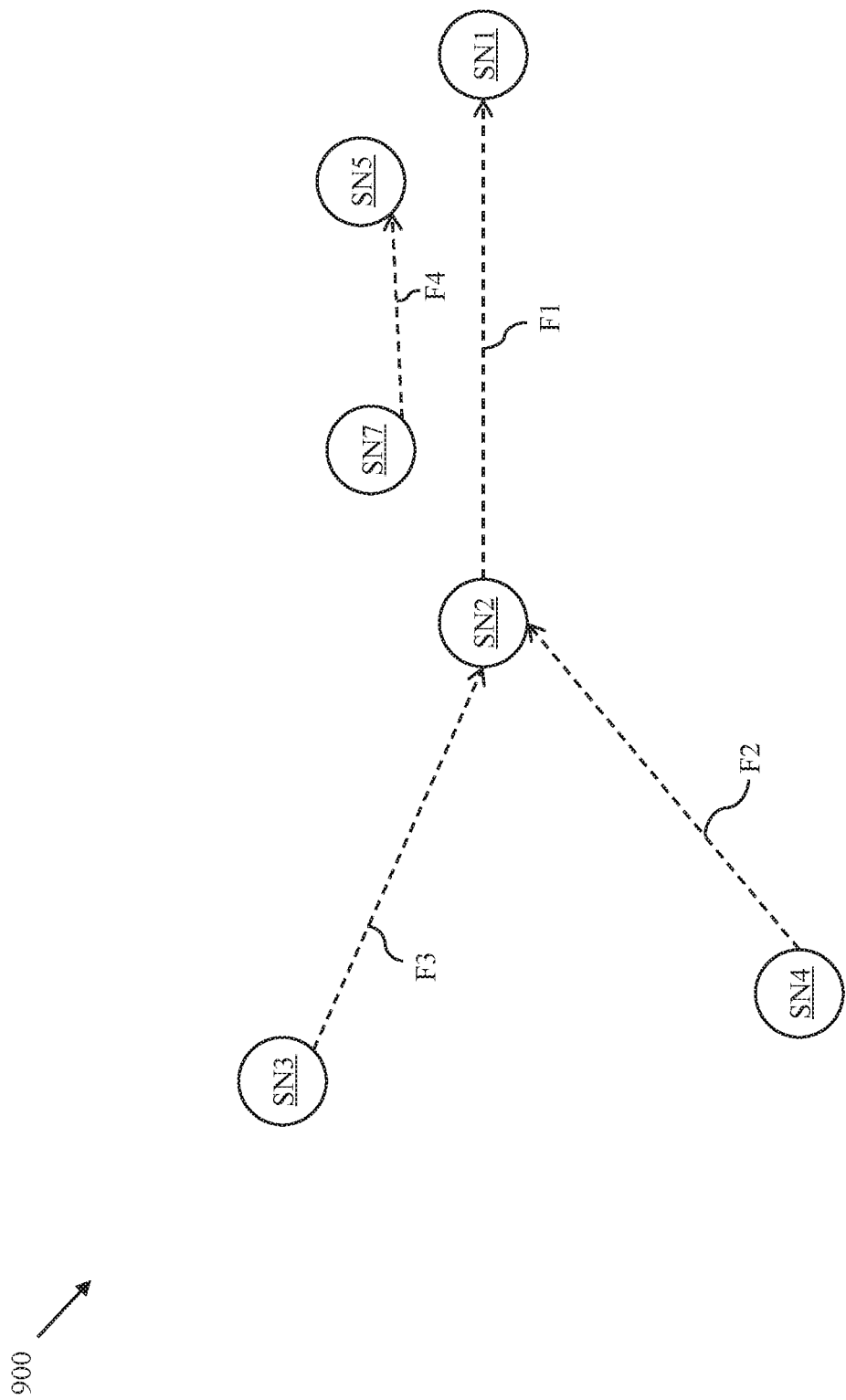
FIG. 9 is a block diagram that illustrates a first functional graph of the first extended graph of FIG. 6 in accordance with an embodiment of the present invention.

Referring now to FIG. 9, a block diagram illustrating a first functional graph 900 of the first extended graph 600, in accordance with an embodiment of the present invention is shown. The first functional graph 900 is a sub-graph of the first extended graph 600, that includes a first subset of normal nodes SN1-SN5 and SN7 of the sixth set of normal nodes SN1-SN11 and the third set of functional edges F1-F4. To generate the first functional graph 900, the processor 104 decouples the third set of functional edges F1-F4 and corresponding normal nodes (i.e., the first subset of normal nodes SN1-SN5 and SN7) from the first extended graph 600, such that remaining normal nodes and the sixth set of real edges SE1-SE10 are excluded in the first functional graph 900. Similarly, a set of functional graphs (that includes the first functional graph 900) is generated by decoupling the functional edges in the corresponding extended graphs, respectively.

Figure 10:
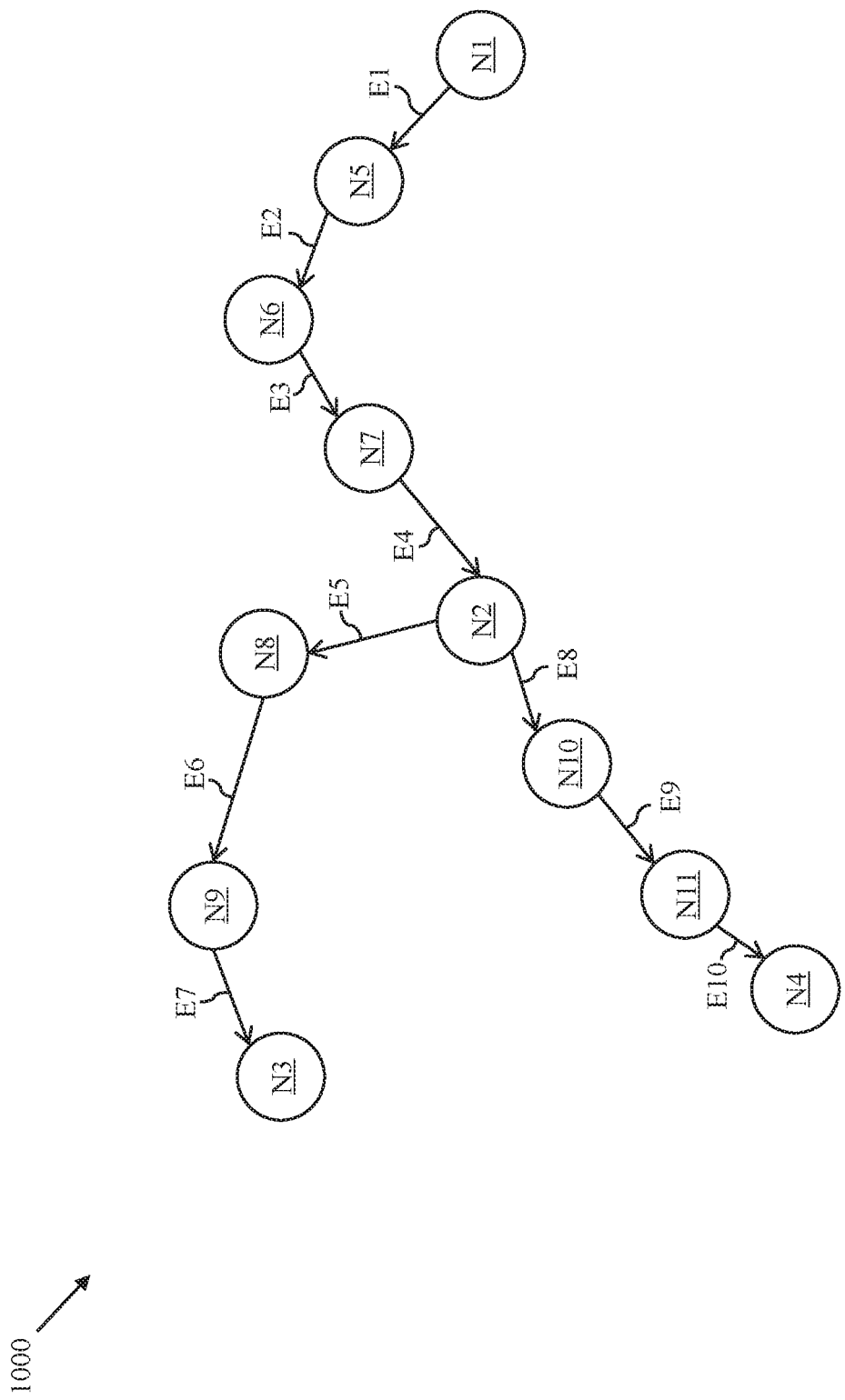
FIG. 10 is a block diagram that illustrates a first real sub-graph of a set of real-sub graphs of the input graph of FIG. 2 in accordance with an embodiment of the present invention.

Referring now to FIG. 10, a block diagram illustrating a first real sub-graph 1000 of a set of real sub-graphs of the input graph 200, in accordance with an embodiment of the present invention is shown. The topological checks are executed by the processor 104 on the input graph 200 based on the set of graphical rules 108 to identify the set of real sub-graphs from the input graph 200 such each real sub-graph is isomorphic to a real graph, such as the first real graph 800.

The sub-graph isomorphic mapping for identifying the first real sub-graph 1000 is performed by comparing a second set of node attributes of each normal node in the first real graph 800 with the first set of node attributes of each normal node in the input graph 200. Similarly, the second set of edge attributes of each real edge in the first real graph 800 is compared with the first set of edge attributes of each real edge in the input graph 200. Based on the above comparisons, a normal node and a real edge is identified in the input graph 200. In one example, the second set of node attributes of the second normal node SN1 is compared with the first set of node attributes of each normal node in the input graph 200 to identify a corresponding normal node, i.e., the first normal node N1 in the input graph 200. Multiple such comparisons are performed for identifying a corresponding set of normal nodes and a corresponding set of real edges in the input graph 200 for the sixth set of normal nodes SN1-SN11 and the sixth set of real edges SE 1-SE10 of the first real graph 800, respectively, to generate the first real sub-graph 1000. Thus, the first real sub-graph 1000 is identified such that each normal node in the first real sub-graph 1000 has a corresponding normal node in the first real graph 800, and each real edge in the first real sub-graph 1000 has a corresponding real edge in the first real graph 800.

The first real sub-graph 1000 hence includes a second subset of normal nodes N1-N11 of the first set of normal nodes N1-N30, hereinafter referred to as a "tenth set of normal nodes N1-N11", and a first subset of real edges E1-E10 of the first set of real edges E1-E35, hereinafter referred to as a "tenth set of real edges E1-E10".

Figure 11:
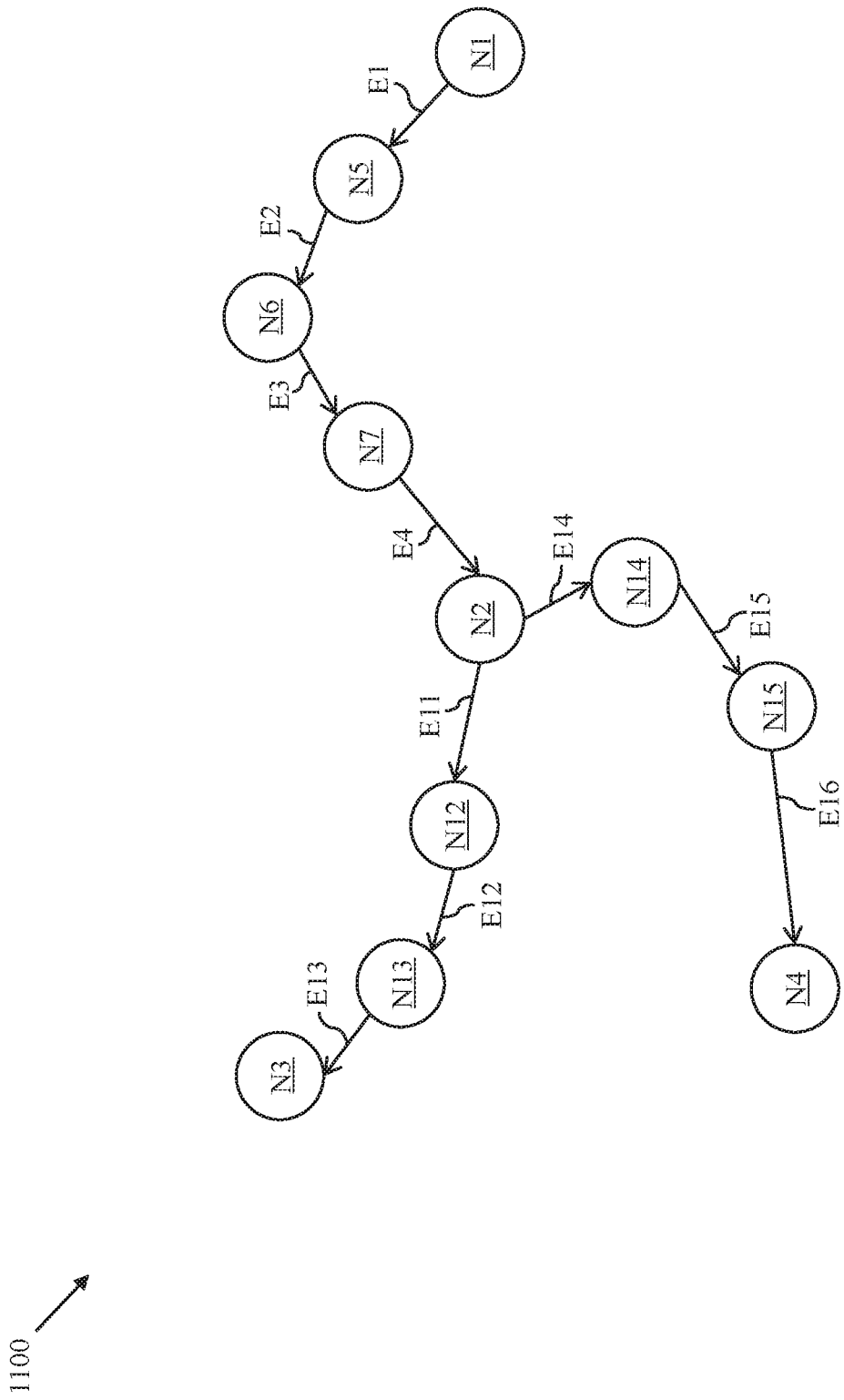
FIG. 11 is a block diagram that illustrates a second real sub-graph of the set of real-sub graphs of the input graph of FIG. 2 in accordance with an embodiment of the present invention.

Referring now to FIG. 11, a block diagram illustrating a second real sub-graph 1100 of the set of real sub-graphs of the input graph 200, in accordance with an embodiment of the present invention is shown. The second real sub-graph 1100 is a sub-graph of the input graph 200 such that the second real sub-graph 1100 is isomorphic to the first real graph 800. The second real sub-graph 1100 is identified by the processor 104 in a manner similar to the identification of the first real sub-graph 1000. The second real sub-graph 1100 includes a third subset of normal nodes N1-N7 and N12-N15 of the first set of normal nodes N1-N30, hereinafter referred to as an "eleventh set of normal nodes N1-N7 and N12-N15", and a second subset of real edges E1-E4 and E11-E16 of the first set of real edges E1-E35, hereinafter referred to as an "eleventh set of real edges E1-E4 and E11-E16".

Figure 12:
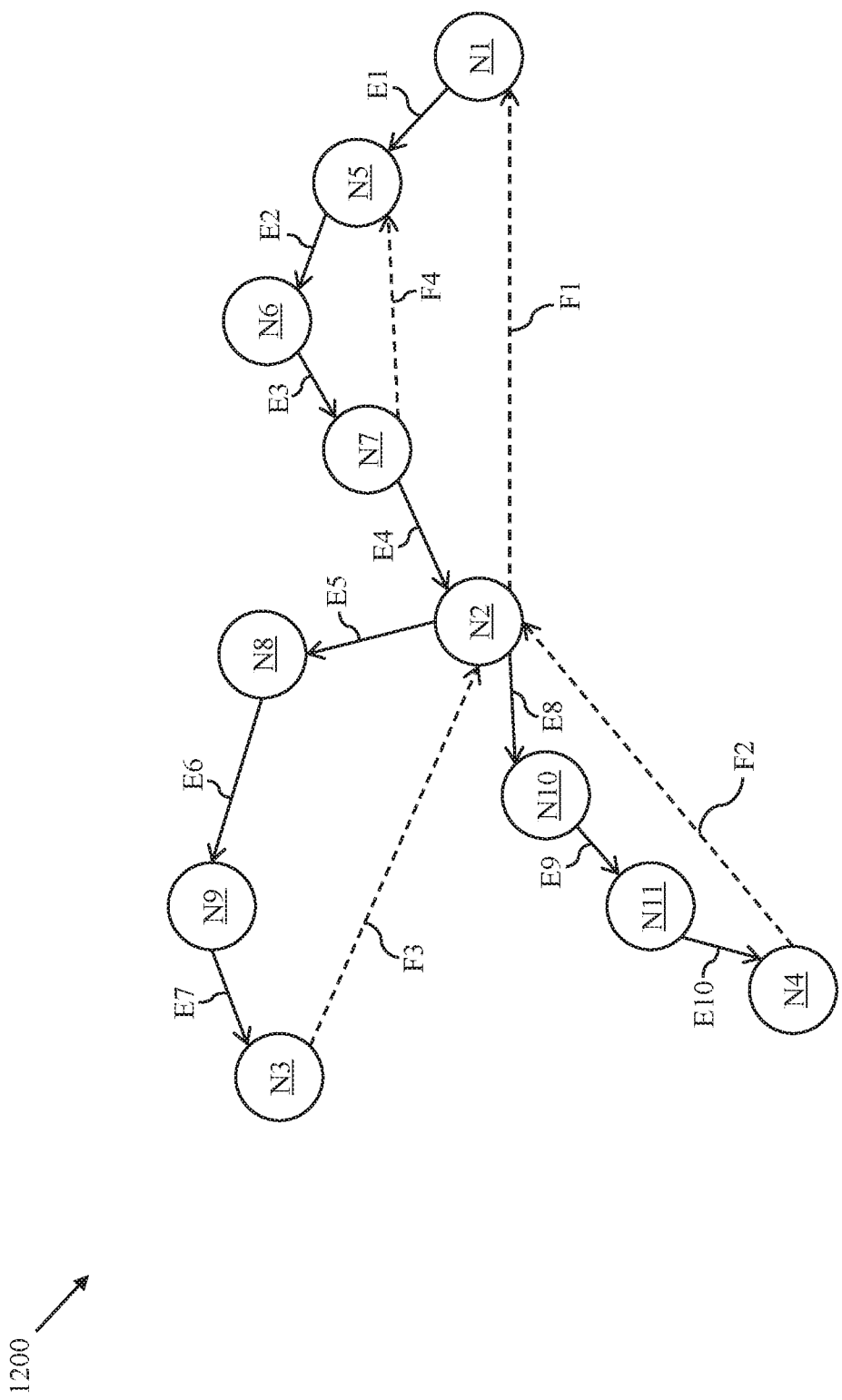
FIG. 12 is a block diagram that illustrates a first functional sub-graph of the first real sub-graph of FIG. 10 in accordance with an embodiment of the present invention.

Referring now to FIG. 12, a block diagram illustrating a first functional sub-graph 1200 of the first real sub-graph 1000, in accordance with an embodiment of the present invention is shown. The processor 104 generates a set of functional sub-graphs by combining the first functional graph 900 with each real sub-graph of the set of real sub-graphs. The processor 104 generates the first functional sub-graph 1200 by combining the first real sub-graph 1000 with the first functional graph 900. The first functional sub-graph 1200 thus includes the tenth set of normal nodes N1-N11, the tenth set of real edges E1-E10, and the third set of functional edges F1-F4.

Figure 13:
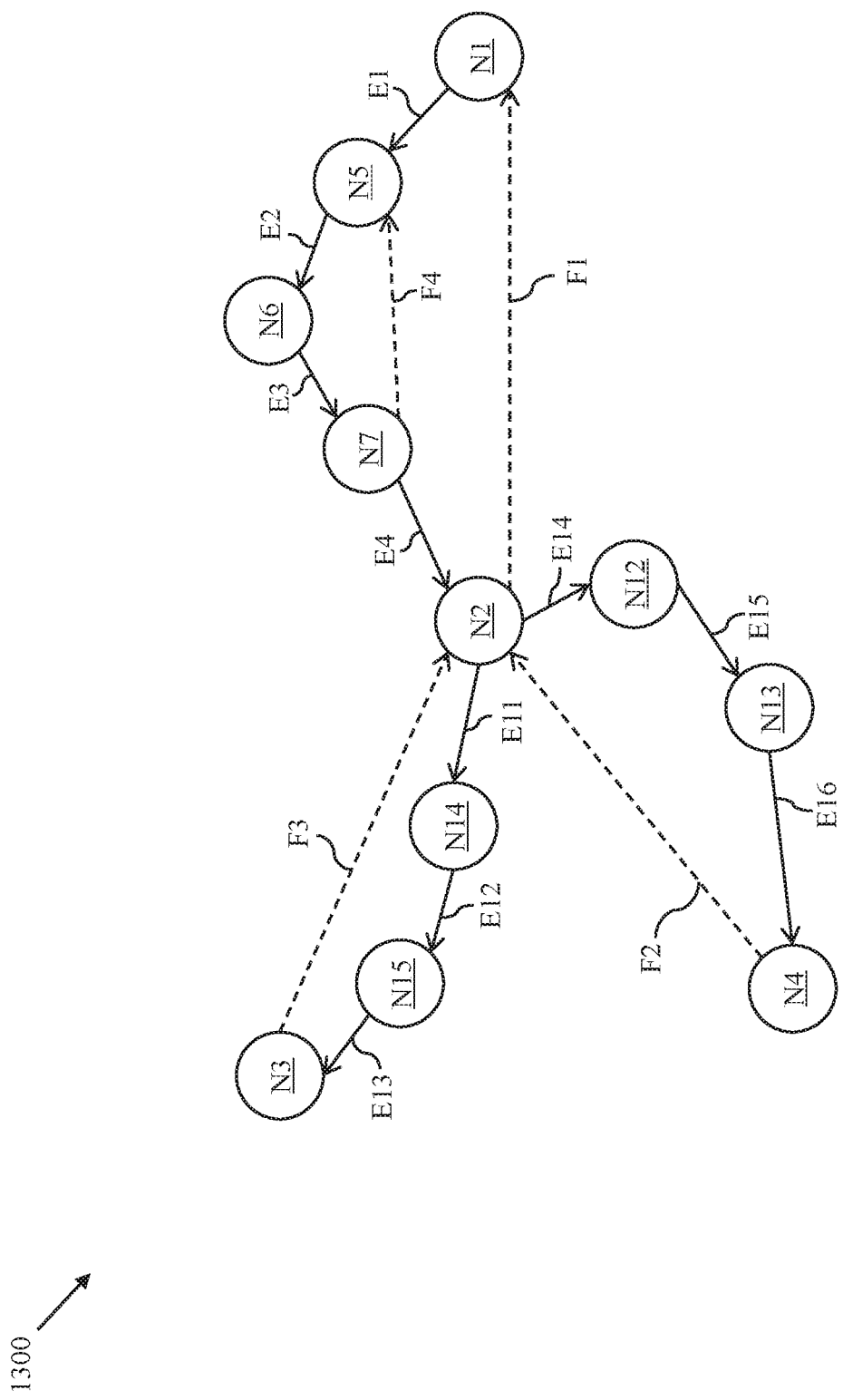
FIG. 13 is a block diagram that illustrates a second functional sub-graph of the second real sub-graph of FIG. 11 in accordance with an embodiment of the present invention.

Referring now to FIG. 13, a block diagram illustrating a second functional sub-graph 1300 of the second real sub-graph 1100, in accordance with an embodiment of the present invention is shown. The processor 104 generates the second functional sub-graph 1300 by combining the second real sub-graph 1100 with the first functional graph 900. The second functional sub-graph 1300 thus includes the eleventh set of normal nodes N1-N7 and N12-N15, the eleventh set of real edges E1-E4 and E11-E16, and the third set of functional edges F1-F4.

The processor 104 executes the second set of functional filters to filter the set of functional sub-graphs and obtain a first subset of functional sub-graphs. The second set of functional filters are associated with each stretchable node of the set of stretchable nodes S1-S3 and each normal node of the second set of normal nodes SN1-SN4. The set of filter rules 110 further define the second set of functional filters such that the second set of functional filters includes first and second subsets of functional filters. The first and second subsets of functional filters are associated with each normal node of the second set of normal nodes SN1-SN4 and each stretchable node of the set of stretchable nodes S1-S3, respectively, in each functional sub-graph, such as the first functional sub-graph 1200. In one embodiment, the first and second functional sub-graphs 1200 and 1300 satisfy the first set of functional filters and are included in the first subset of functional sub-graphs. The remaining functional sub-graphs of the set of functional sub-graphs fail to satisfy the first set of functional filters and are filtered out.

Figure 14:
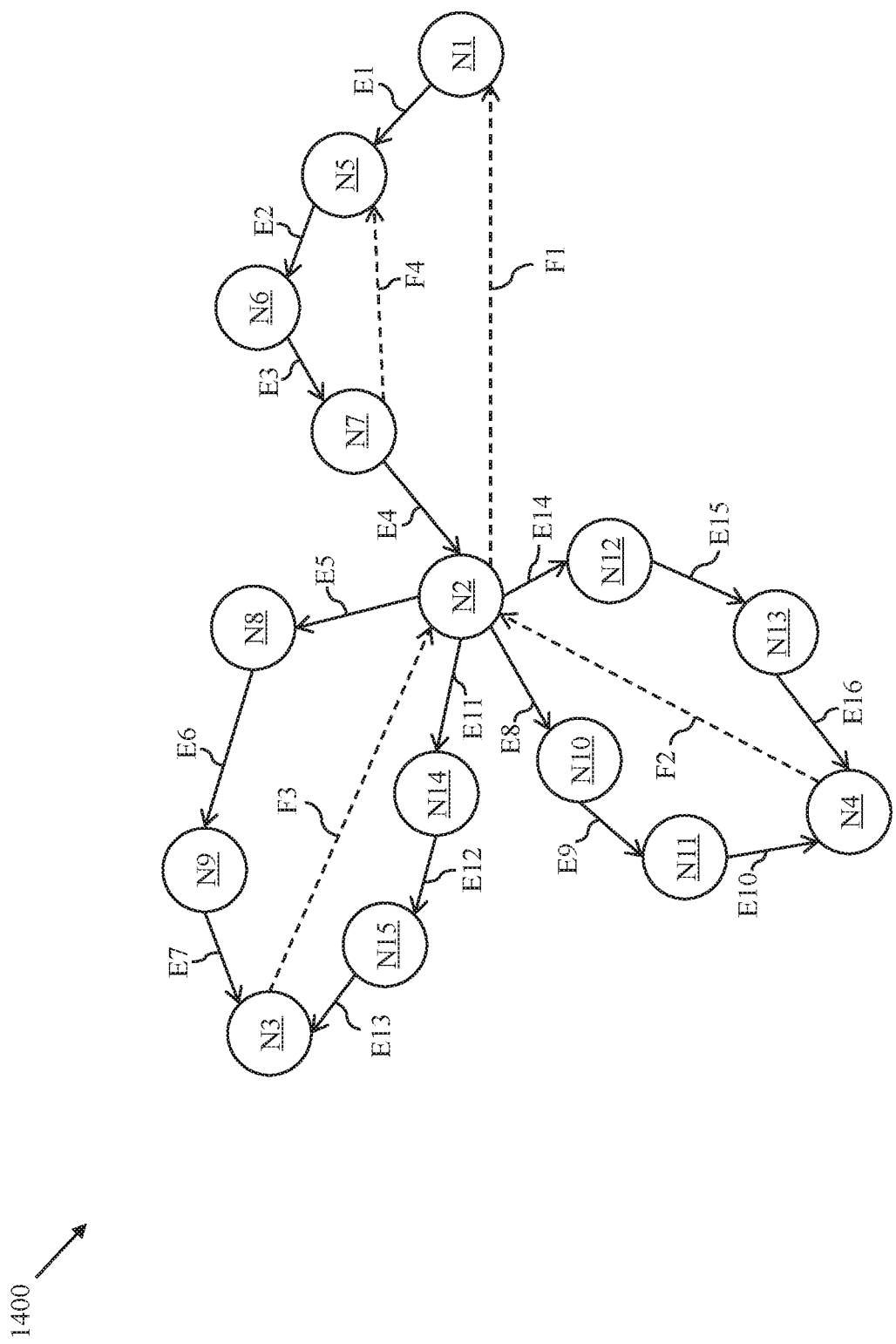
FIG. 14 is a block diagram that illustrates a composed graph of the first and second functional sub-graphs of FIGS. 12 and 13, respectively, in accordance with an embodiment of the present invention.

Referring now to FIG. 14, a block diagram illustrating a composed graph 1400 of the first and second functional sub-graphs 1200 and 1300, in accordance with an embodiment of the present invention is shown. The composed graph 1400 is a union of the first subset of functional sub-graphs that satisfy the second set of functional filters. To generate the composed graph 1400, the processor 104 combines the first subset of functional sub-graphs, i.e., the first and second functional sub-graphs 1200 and 1300 based on a set of union markers. The set of union markers is associated with a fourth subset of normal nodes that includes the second and third normal nodes SN1 and SN2 of the second set of normal nodes SN1-SN4, and a first subset of stretchable nodes that includes the first stretchable node S1 of the set of stretchable nodes S1-S3. The fourth subset of normal nodes of the test graph 400 corresponds to a fifth subset of normal nodes that includes the first normal node N1 and a fifth normal node N2 of the tenth set of normal nodes N1-N11 of the first functional sub-graph 1200. The first subset of stretchable nodes that includes the first stretchable node S1 of the test graph 400 corresponds to a sixth subset of normal nodes N5-N7 of the tenth set of normal nodes N1-N11 of the first functional sub-graph 1200. A union marker defines a common node for combining multiple graphs. Thus, the first and fifth normal nodes N1 and N2 and the sixth subset of normal nodes N5-N7 are common nodes for combining the first and second functional sub-graphs 1200 and 1300. The processor 104 combines the first and second functional sub-graphs 1200 and 1300 such that a path between the first and fifth normal nodes N1 and N2 that passes through the sixth subset of normal nodes N5-N7 is same in both the first and second functional sub-graphs 1200 and 1300. It will be understood by those of skill in the art that a path between normal nodes that are not associated with union markers may vary, such as the path between third and fourth normal nodes SN2 and SN3. The composed graph 1400 includes a seventh subset of normal nodes N1-N15 of the first set of normal nodes N1-N30, a third subset of real edges E1-E16 of the first set of real edges E1-E35, and the third set of functional edges F1-F4.

Figure 15:
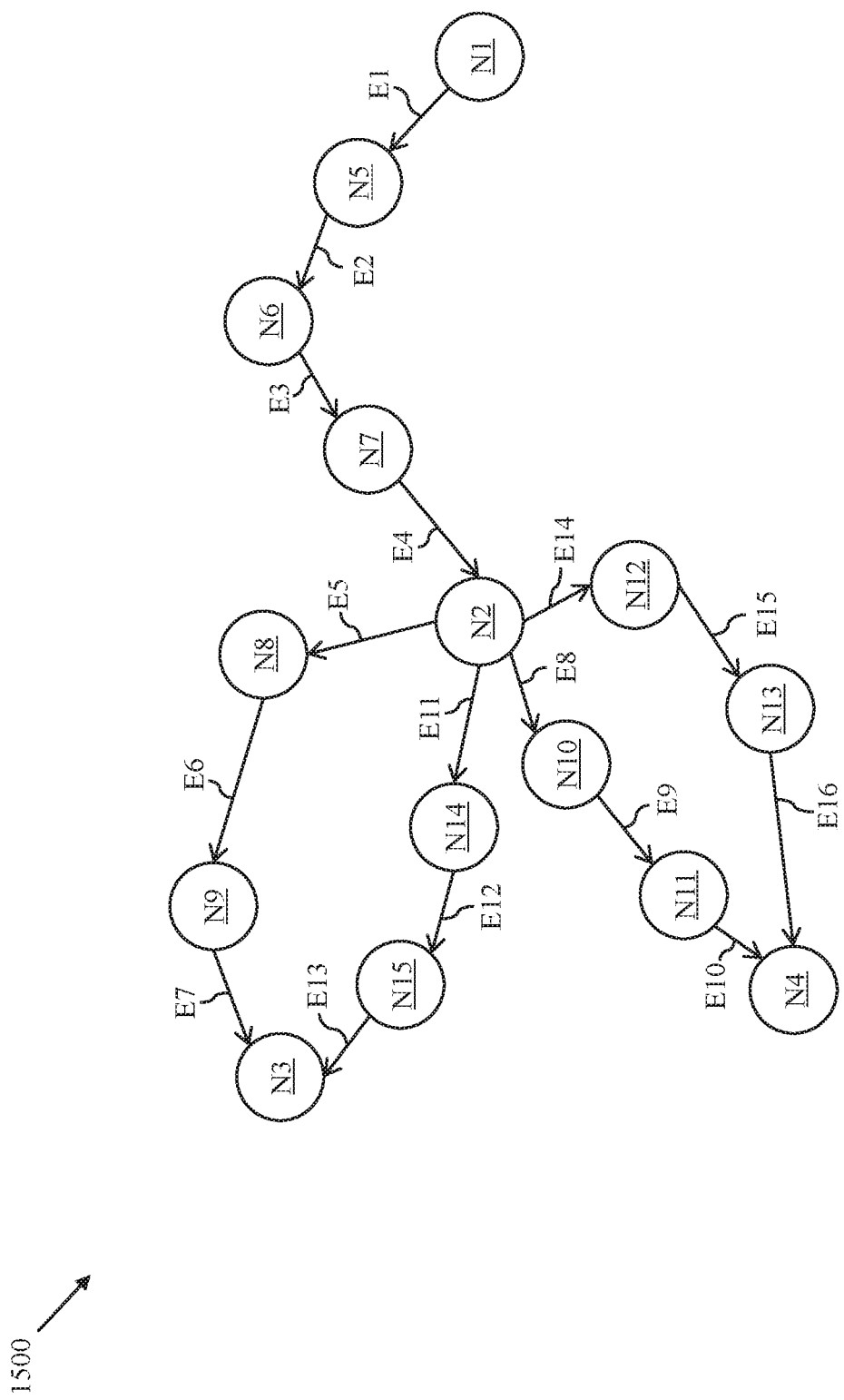
FIG. 15 is a block diagram that illustrates an output graph based on the composed graph of FIG. 14 in accordance with an embodiment of the present invention.

Referring now to FIG. 15, a block diagram illustrating an output graph 1500 based on the composed graph 1400, in accordance with an embodiment of the present invention is shown. The output graph 1500 is a sub-graph of the input graph 200 that satisfies the desired criteria of the topology defined by the set of topological filters and the desired functions defined by the first and second sets of functional filters. To identify the output graph 1500, the processor 104 executes the second set of functional filters on the composed graph 1400. The set of filter rules 110 further define the second set of functional filters that is associated with each functional edge of the third set of functional edges F1-F4. The processor 104 executes functional checks, i.e., the second set of functional filters, by checking whether the composed graph 1400 satisfies the second set of functional filters (i.e., satisfies the desired functions defined by the test graph 400). The output graph 1500 includes the seventh subset of normal nodes N1-N15 and the third subset of real edges E1-E16.

It will be apparent to those of skill in the art that multiple output graphs may be identified corresponding to the multiple base graphs for graphically verifying corresponding portions the ECD 106, respectively, in a manner similar to the identification of the output graph 1500.

Figure 16:
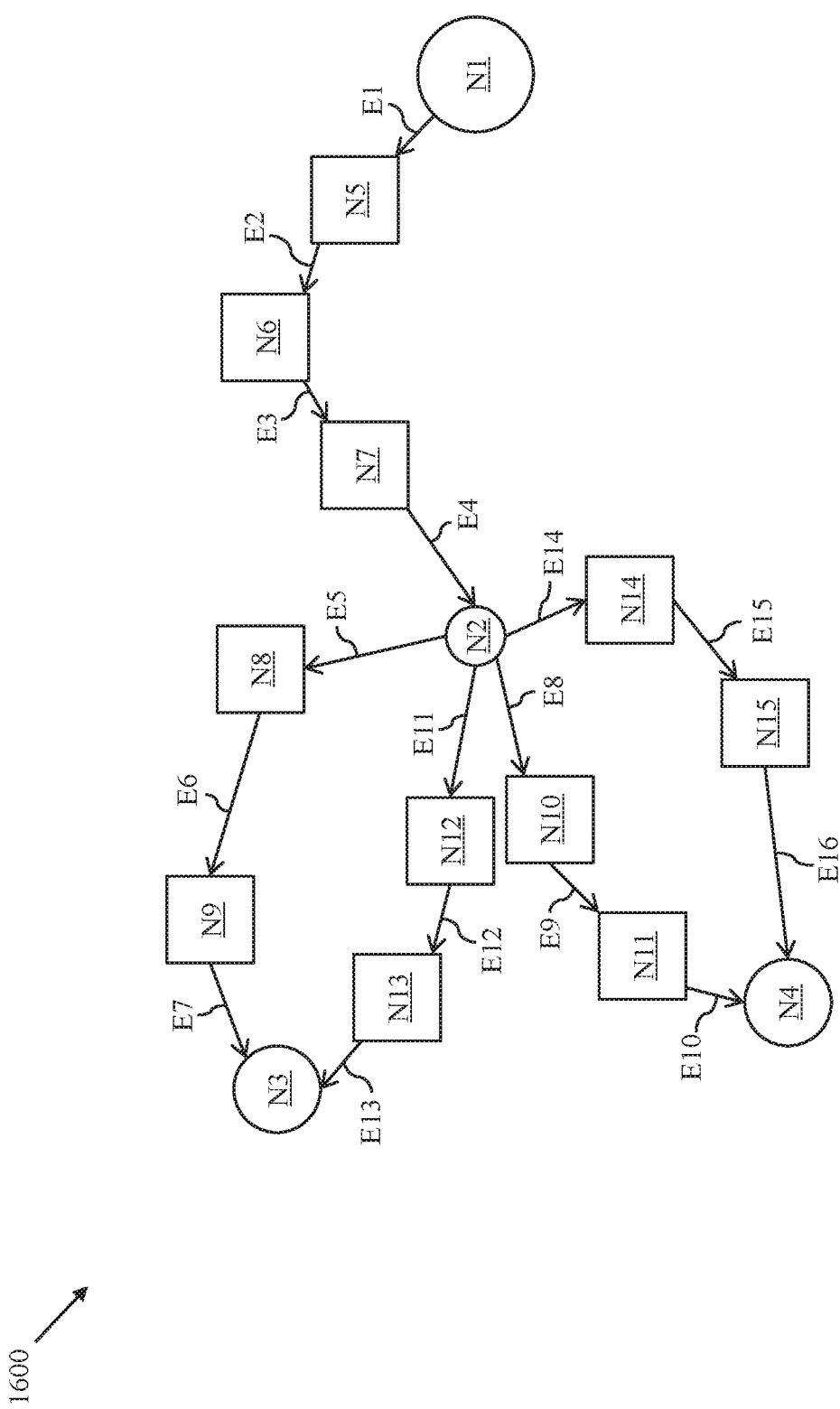
FIG. 16 is a block diagram that illustrates an enhanced graph of the output graph of FIG. 15 in accordance with an embodiment of the present invention.

Referring now to FIG. 16, a block diagram illustrating an enhanced graph 1600 of the output graph 1500, in accordance with an embodiment of the present invention is shown. The enhanced graph 1600 is a visually modified graph of the output graph 1500 that is utilized to debug the ECD 106. The processor 104 generates the enhanced graph 1600 of the output graph 1500 by defining at least one of a shape, a color, and a size of each normal node and each real edge of the output graph 1500. The enhanced graph 1600 includes the seventh subset of normal nodes N1-N15 and the third subset of real edges E1-E16. In one example, a shape of the first normal node N1 is a 'circle' and a size of the first normal node N1 is '12 millimeters (mm)'. A shape of the fifth normal node N2 is a 'circle' and a size of the fifth normal node N2 is '10 mm'. A shape of sixth and seventh normal nodes N3 and N4 is a 'circle' and a size of the sixth and seventh normal nodes N3 and N4 is '7 mm'. A shape of eighth through eighteenth normal nodes N5-N15 is a 'square' and a size of the eighth through eighteenth normal nodes N5-N15 is '10 mm'. A color of the third subset of real edges E1-E16 is 'black'. The enhanced graph 1600 may be displayed on a screen (not shown) associated with the EDA tool 100 for analyzing the ECD 106 by the user. Similarly, multiple enhanced graphs may be generated corresponding to the multiple output graphs, respectively.

Figure 17A:
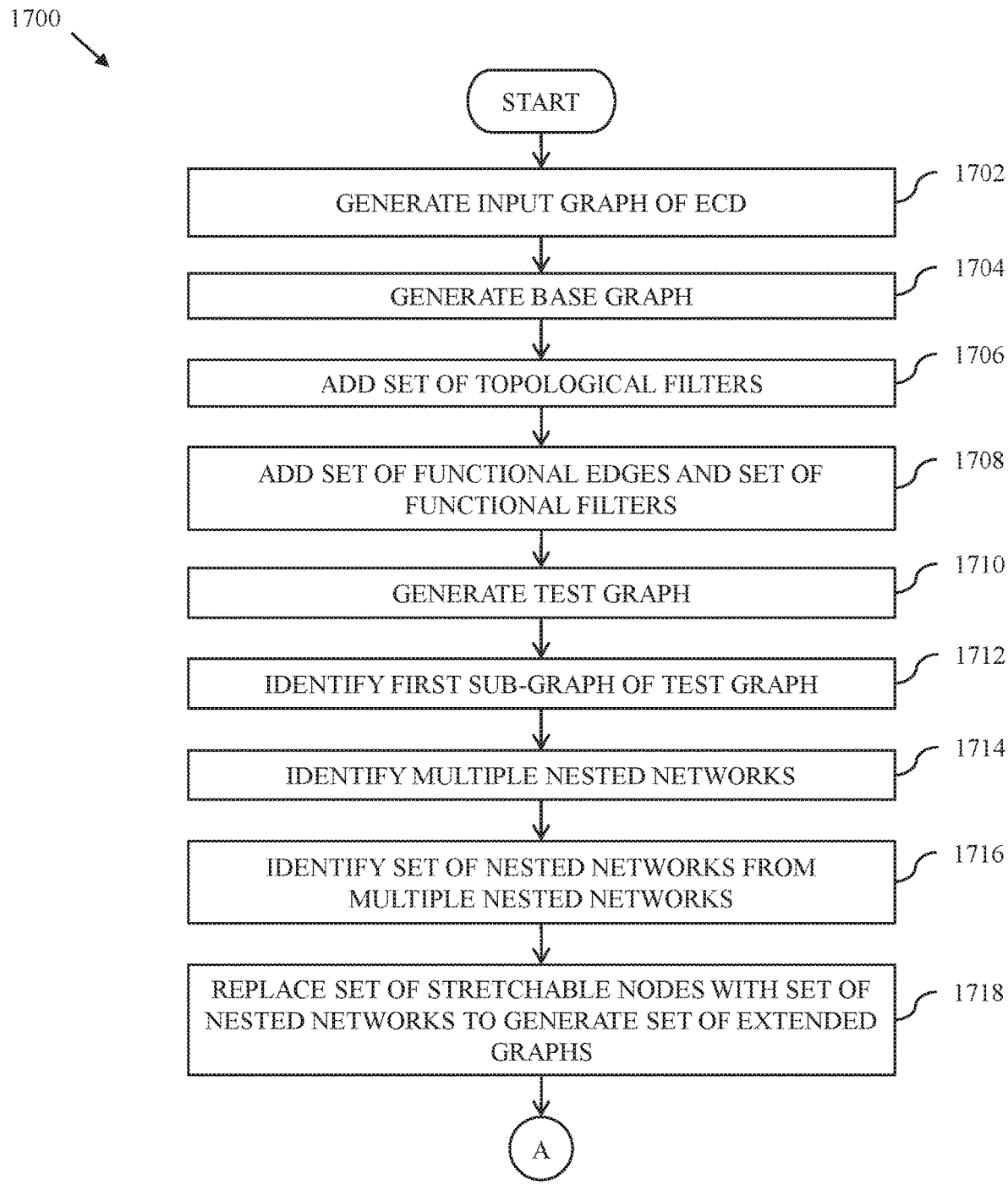
FIGS. 17A and 17B, collectively, represent a flow chart that illustrates a method for executing topological and functional checks on the ECD of FIG. 1 in accordance with an embodiment of the present invention.
Figure 17B:
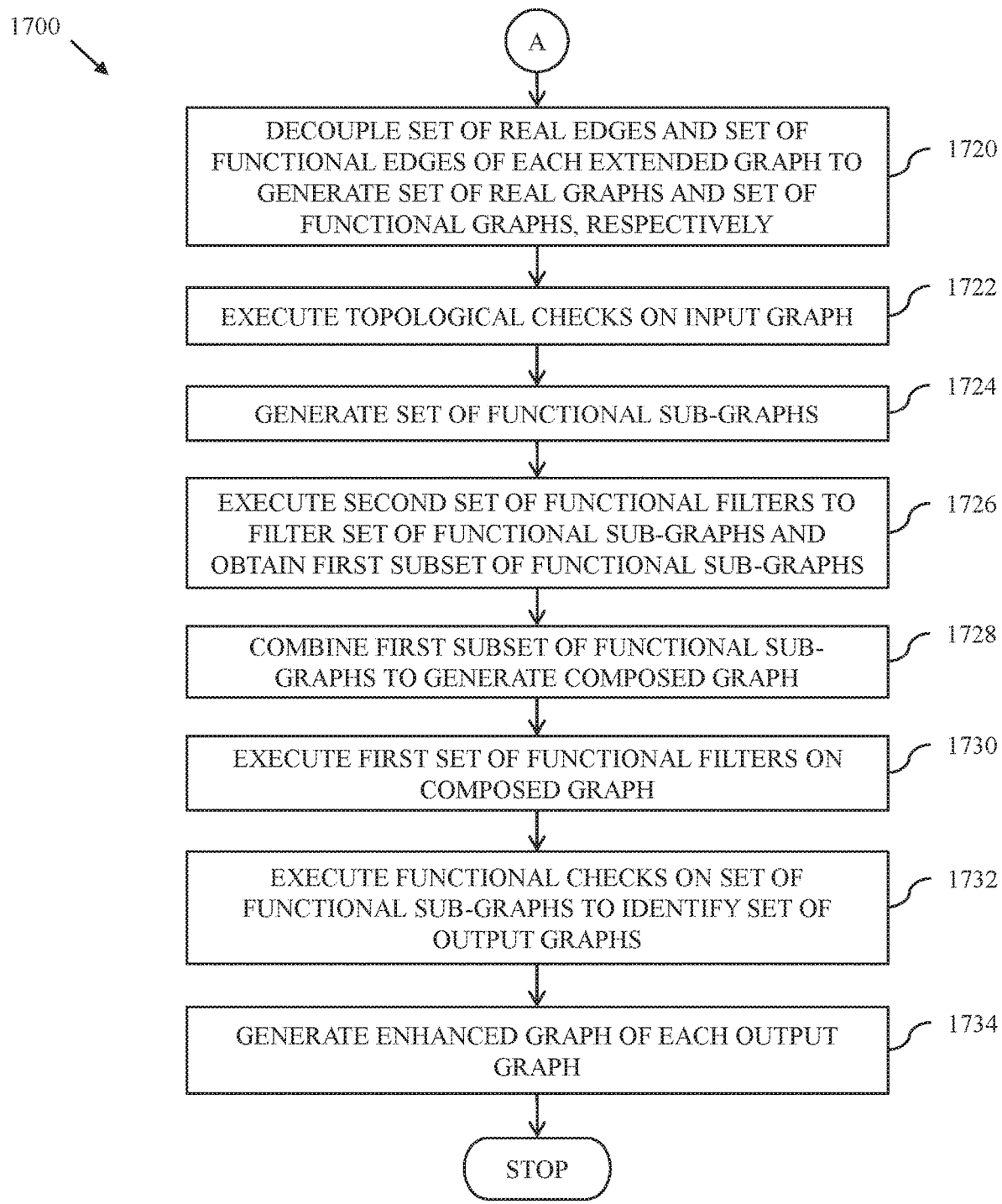

Referring now to FIGS. 17A and 17B, a flow chart 1700 illustrating a method for executing the topological and functional checks on the ECD 106, in accordance with an embodiment of the present invention is shown.

At step 1702, the processor 104 generates the input graph 200 of the ECD 106. The input graph 200 includes the first set of normal nodes N1-N30 and the first set of real edges E1-E35. Each normal node of the first set of normal nodes N1-N30 is associated with the first set of node attributes, and each real edge of the first set of real edges E1-E35 is associated with the first set of edge attributes. At step 1704, the processor 104 generates the base graph 300 using the second set of normal nodes SN1-SN4, the second set of real edges SE1-SE6, and the set of stretchable nodes S1-S3. Each normal node of the second set of normal nodes SN1-SN4, and each stretchable node of the set of stretchable nodes S1-S3 is associated with the second set of node attributes. Each real edge of the second set of real edges SE1-SE6 is associated with the second set of edge attributes.

At step 1706, the processor 104 adds the set of topological filters to the second set of normal nodes SN1-SN4 and the set of stretchable nodes S1-S3, of the base graph 300. At step 1708, the processor 104 adds the first set of functional edges F1-F3 to the base graph 300, and the second set of functional filters to the first set of functional edges F1-F3 of the base graph 300. Each functional edge of the first set of functional edges F1-F3 is associated with the second set of edge attributes. At step 1710, the processor 104 generates the test graph 400 based on the ECD 106. The test graph 400 includes the second set of normal nodes SN1-SN4, the second set of real edges SE1-SE6, the set of stretchable nodes S I-S3, and the first set of functional edges F1-F3.

At step 1712, the processor 104 identifies the first sub-graph 500 such that the first sub-graph 500 includes the second set of normal nodes SN1-SN4, the second set of real edges SE1-SE6, and the set of stretchable nodes S1-S3. At step 1714, the processor 104 identifies multiple nested networks between two normal nodes, such as the second and third normal nodes SN1 and SN2, in the first sub-graph 500. Each nested network includes a set of normal nodes and a set of real edges. At step 1716, the processor 104 identifies the first and second sets of nested networks, i.e., the first through third nested networks NW1-NW3, and the fourth through sixth nested networks NW4-NW6, based on the predefined minimum and maximum path lengths between the two normal nodes.

At step 1718, the processor 104 replaces the set of stretchable nodes S1-S3 with the first and second sets of nested networks, i.e., the first through third nested networks NW1-NW3 and the fourth through sixth nested networks NW4-NW6, to generate the set of extended graphs, i.e., the first and second extended graphs 600 and 700, respectively. The first extended graph 600 includes the sixth set of normal nodes SN1-SN11, the sixth set of real edges SE1-SE10, and the third set of functional edges F1-F4. The second extended graph 700 includes the ninth set of normal nodes SN1-SN7 and SN12-SN16, the ninth set of real edges SE1-SE8 and SE11-SE13, and the third set of functional edges F1-F4.

At step 1720, the processor 104 decouples a set of real edges (such as the sixth set of real edges SE1-SE10) and a set of functional edges (such as the third set of functional edges F1-F4) of each extended graph (such as the first extended graph 600), to generate the set of real graphs (such as the first real graph 800) and the set of functional graphs (such as the first functional graph 900), respectively.

At step 1722, the processor 104 executes the topological checks on the input graph 200, based on the set of graphical rules 108, to identify the set of real sub-graphs, such as the first and second real sub-graphs 1000 and 1100, from the input graph 200. The topological checks are further executed based on the first and second sets of node attributes and the first and second sets of edge attributes. The first and second real sub-graphs 1000 and 1100 are isomorphic to the first real graph 800 of the set of real graphs. The first real sub-graph 1000 is identified such that each normal node in the first real sub-graph 1000 has a corresponding normal node in the first real graph 800, and each real edge in the first real sub-graph 1000 has a corresponding real edge in the first real graph 800. At step 1724, the processor 104 generates a set of functional sub-graphs, such as the first and second functional sub-graphs 1200 and 1300, by combining the first functional graph 900 with the first and second real sub-graphs 1000 and 1100, respectively.

At step 1726, the processor 104 executes the second set of functional filters to filter the set of functional sub-graphs to obtain a first subset of functional sub-graphs, such as the first and second functional sub-graphs 1200 and 1300. At step 1728, the processor 104 combines the first subset of functional sub-graphs (i.e., the first and second functional sub-graphs 1200 and 1300) to generate the composed graph 1400 based on the set of union markers. The set of union markers is associated with the fourth subset of normal nodes of the second set of normal nodes SN1-SN4, and the first subset of stretchable nodes of the set of stretchable nodes S1-S3. At step 1730, the processor 104 executes the first set of functional filters on the composed graph 1400.

At step 1732, the processor 104 executes the functional checks on the set of functional sub-graphs based on the set of filter rules 110 to identify the set of output graphs, such as the output graph 1500. The functional checks are further executed based on the first and second sets of node attributes and the first and second sets of edge attributes. The set of filter rules 110 define the first set of functional filters and the second set of functional filters. The first set of functional filters are associated with each functional edge of the first set of functional edges F1-F3. The second set of functional filters are associated with each stretchable node of the first set of stretchable nodes S1-S3 and each normal node of the second set of normal nodes SN1-SN4. At step 1734, the processor 104 generates an enhanced graph, such as the enhanced graph 1600, of each output graph, such as the output graph 1500, by defining at least one of a shape, a color, and a size of each normal node and each real edge of the output graph 1500. The enhanced graph 1600 is utilized to debug the ECD 106.

The processor 104 executes the second subset of functional filters associated with the set of stretchable nodes S1-S3 such that a number of topologies of the ECD 106 to be verified are reduced as compared to a number of topologies implemented by conventional methods of graphical verification of an ECD, thereby providing a higher speed of operation of the EDA tool 100 as compared to conventional EDA tools. Further, the processor 104 executes the topological checks based on the test graph 400, to verify various topologies of the ECD 106 that are defined by the set of extended graphs, such as the first and second extended graphs 600 and 700, simultaneously. In addition, the functional checks are performed by verifying whether the ECD 106 has required functionalities based on the first set of functional edges F1-F3 of the test graph 400. Thus, the EDA tool 100 executes both the topological and functional checks graphically. Further, the composed graph 1400 that is generated based on the set of union markers is utilized to generate the output graph 1500 such that all the topologies having common normal nodes associated with the set of union markers may be analyzed in an intuitive manner by the user.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An electronic design automation (EDA) tool for executing topological and functional checks on an electronic circuit design, the EDA tool comprising:
 a memory that is configured to store the electronic circuit design, a set of graphical rules, and a set of filter rules for executing the topological and functional checks; and
 a processor that communicates with the memory, wherein the processor is configured to:
  generate a test graph based on the electronic circuit design, wherein the test graph comprises a first set of normal nodes, a set of stretchable nodes, a first set of real edges, and a first set of functional edges;
  replace the set of stretchable nodes with a set of nested networks in the test graph to generate a set of extended graphs, wherein each extended graph comprises the first set of normal nodes, the set of nested networks, a second set of real edges, and a second set of functional edges;
  decouple the second set of real edges and the second set of functional edges of each extended graph to generate a set of real graphs and a set of functional graphs, respectively;
  execute the topological checks on an input graph of the electronic circuit design, based on the set of graphical rules, to identify a set of real sub-graphs from the input graph, wherein each real sub-graph is isomorphic to a first real graph of the set of real graphs;
  generate a set of functional sub-graphs by combining a first functional graph of the set of functional graphs with each real sub-graph; and
  execute the functional checks on the set of functional sub-graphs, based on the set of filter rules, to identify a set of output graphs.

2. The EDA tool of claim 1, wherein the set of filter rules define a first set of functional filters and a second set of functional filters, and wherein the first set of functional filters are associated with each stretchable node and each normal node of the first set of normal nodes, and the second set of functional filters are associated with each functional edge of the first set of functional edges.

3. The EDA tool of claim 2, wherein to execute the functional checks on the set of functional sub-graphs, the processor is further configured to:
 execute the first set of functional filters to filter the set of functional sub-graphs and obtain a first subset of functional sub-graphs;
 combine the first subset of functional sub-graphs to generate a composed graph based on a set of union markers, wherein the set of union markers is associated with a first subset of normal nodes of the first set of normal nodes and a first subset of stretchable nodes of the set of stretchable nodes; and
 execute the second set of functional filters on the composed graph.

4. The EDA tool of claim 1, wherein each normal node of the first set of normal nodes, and each stretchable node is associated with a first set of node attributes, and each real edge of the first set of real edges and each functional edge of the first set of functional edges is associated with a first set of edge attributes.

5. The EDA tool of claim 4, wherein the processor is further configured to:
 generate the input graph, wherein the input graph comprises a second set of normal nodes and a third set of real edges.

6. The EDA tool of claim 5, wherein each normal node of the second set of normal nodes is associated with a second set of node attributes, and each real edge of the third set of real edges is associated with a second set of edge attributes, and wherein the topological checks and the functional checks are further executed based on the first and second sets of node attributes and the first and second sets of edge attributes.

7. The EDA tool of claim 1, wherein to generate the test graph, the processor is further configured to:
generate a base graph using the first set of normal nodes, the set of stretchable nodes, and the first set of real edges:
add a set of topological filters to the first set of normal nodes and the set of stretchable nodes of the base graph; and
add the first set of functional edges to the base graph, and a set of functional filters to the first set of functional edges of the base graph, to generate the test graph.

8. The EDA tool of claim 1, wherein to replace the set of stretchable nodes with the set of nested networks, the processor is further configured to:
identify a first sub-graph of the test graph such that the first sub-graph includes the first set of normal nodes, the set of stretchable nodes, and the first set of real edges;
identify a plurality of nested networks between first and second normal nodes of the first set of normal nodes in the first sub-graph such that each nested network of the plurality of nested networks comprises a third set of normal nodes and a fourth set of real edges; and
identify the set of nested networks from the plurality of nested networks based on predefined minimum and maximum path lengths between the first and second normal nodes.

9. The EDA tool of claim 1, wherein a first real sub-graph of the set of real sub-graphs is identified such that each normal node in the first real sub-graph has a corresponding normal node in the first real graph, and each real edge in the first real sub-graph has a corresponding real edge in the first real graph.

10. The EDA tool of claim 1, wherein the processor is further configured to:
generate an enhanced graph of each output graph by defining at least one of a shape, a color, and a size of each normal node and each real edge of each output graph, wherein the enhanced graph is utilized to debug the electronic circuit design.

11. A method for executing topological and functional checks on an electronic circuit design by using an electronic design automation (EDA) tool, wherein the EDA tool includes a memory and a processor in communication with the memory, and wherein the memory stores the electronic circuit design, a set of graphical rules, and a set of filter rules for executing the topological and functional checks, the method comprising:
generating a test graph based on the electronic circuit design, wherein the test graph comprises a first set of normal nodes, a set of stretchable nodes, a first set of real edges, and a first set of functional edges;
replacing the set of stretchable nodes with a set of nested networks in the test graph to generate a set of extended graphs, wherein each extended graph comprises the first set of normal nodes, the set of nested networks, a second set of real edges, and a second set of functional edges;
decoupling the second set of real edges and the second set of functional edges of each extended graph to generate a set of real graphs and a set of functional graphs, respectively;
executing the topological checks on an input graph of the electronic circuit design, based on the set of graphical rules, to identify a set of real sub-graphs from the input graph, wherein each real sub-graph is isomorphic to a first real graph of the set of real graphs;
generating a set of functional sub-graphs by combining a first functional graph of the set of functional graphs with each real sub-graph; and
executing the functional checks on the set of functional sub-graphs, based on the set of filter rules, to identify a set of output graphs.

12. The method of claim 11, wherein the set of filter rules define a first set of functional filters and a second set of functional filters, and wherein the first set of functional filters are associated with each stretchable node and each normal node of the first set of normal nodes, and the second set of functional filters are associated with each functional edge of the first set of functional edges.

13. The method of claim 12, wherein the step of executing the functional checks on the set of functional sub-graphs further comprises:
executing the first set of functional filters to filter the set of functional sub-graphs to obtain a first subset of functional sub-graphs;
combining the first subset of functional sub-graphs to generate a composed graph based on a set of union markers, wherein the set of union markers is associated with a first subset of normal nodes of the first set of normal nodes and a first subset of stretchable nodes of the set of stretchable nodes; and
executing the second set of functional filters on the composed graph.

14. The method of claim 11, wherein each normal node of the first set of normal nodes, and each stretchable node is associated with a first set of node attributes, and each real edge of the first set of real edges, and each functional edge of the first set of functional edges is associated with a first set of edge attributes.

15. The method of claim 14, further comprising:
generating the input graph, wherein the input graph comprises a second set of normal nodes and a third set of real edges.

16. The method of claim 15, wherein each normal node of the second set of normal nodes is associated with a second set of node attributes, and each real edge of the third set of real edges is associated with a second set of edge attributes, and wherein the topological checks and the functional checks are further executed based on the first and second sets of node attributes and the first and second sets of edge attributes.

17. The method of claim 11, wherein the step of generating the test graph further comprises:
generating a base graph using the first set of normal nodes, the set of stretchable nodes, and the first set of real edges;
adding a set of topological filters to the first set of normal nodes and the set of stretchable nodes of the base graph; and
adding the first set of functional edges to the base graph, and a set of functional filters to the first set of functional edges of the base graph, to generate the test graph.

18. The method of claim 11, wherein the step of replacing the set of stretchable nodes with the set of nested networks further comprises:
- identifying a first sub-graph of the test graph such that the first sub-graph includes the first set of normal nodes, the set of stretchable nodes, and the first set of real edges;
- identifying a plurality of nested networks between first and second normal nodes of the first set of normal nodes in the first sub-graph such that each nested network of the plurality of nested networks comprises a third set of normal nodes and a fourth set of real edges; and
- identifying the set of nested networks from the plurality of nested networks based on predefined minimum and maximum path lengths between the first and second normal nodes.

19. The method of claim 11, wherein a first real sub-graph of the set of real sub-graphs is identified such that each normal node in the first real sub-graph has a corresponding normal node in the first real graph, and each real edge in the first real sub-graph has a corresponding real edge in the first real graph.

20. The method of claim 11, further comprising:
- generating an enhanced graph of each output graph by defining at least one of a shape, a color, and a size of each normal node and each real edge of each output graph, wherein the enhanced graph is utilized to debug the electronic circuit design.

* * * * *